US012795205B2

(12) United States Patent
Gungor et al.

(10) Patent No.: US 12,795,205 B2
(45) Date of Patent: Nov. 10, 2026

(54) METHODS AND SYSTEMS FOR MODIFYING A MEDIA GUIDANCE APPLICATION BASED ON USER DATA

(71) Applicant: Adeia Guides Inc., San Jose, CA (US)

(72) Inventors: Cagri Gungor, Melikgazi (TR); Mustafa Coskun, Kocasinan (TR); Reda Harb, Saint Petersburg, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 19/261,280

(22) Filed: Jul. 7, 2025

(65) Prior Publication Data

US 2026/0012684 A1 Jan. 8, 2026

Related U.S. Application Data

(63) Continuation of application No. 17/954,782, filed on Sep. 28, 2022, now Pat. No. 12,401,853.

(51) Int. Cl.
*H04N 21/466* (2011.01)
*H04N 21/482* (2011.01)

(52) U.S. Cl.
CPC ..... *H04N 21/4668* (2013.01); *H04N 21/4826* (2013.01)

(58) Field of Classification Search
CPC ......... H04N 21/4668; H04N 21/44224; H04N 21/462; H04N 21/812; H04N 21/482; H04N 21/4532; H04N 21/4622; H04N 21/4821; H04N 21/44826; H04N 21/251; H04N 21/25891; H04N 21/47202; H04N 21/4826; H04N 21/2665; H04N 21/6582; H04N 21/44204; H04N 21/4755; H04N 21/2187; H04N 21/4667
USPC ............................................................ 725/46
See application file for complete search history.

(56) References Cited

U.S. PATENT DOCUMENTS 12,425,692 B2 9/2025 Gungor et al.
2006/0224761 A1* 10/2006 Howarth ............ H04N 21/8545 709/231
2015/0206525 A1* 7/2015 Ryder ................. G06F 16/9038 704/260
2019/0069019 A1* 2/2019 Hsu ......................... B66B 3/008
2019/0208242 A1* 7/2019 Bates ................... H04N 21/251
2020/0120393 A1* 4/2020 O'Callaghan .... H04N 21/44224
2022/0318653 A1* 10/2022 Wang ..................... G06N 3/045

* cited by examiner

*Primary Examiner* — Cynthia M Fogg
(74) *Attorney, Agent, or Firm* — HG Law LLP

(57) ABSTRACT

Systems and methods are described for modifying a media guidance application. Such systems and methods may aid a user in selecting media content for viewing which may be of particular interest to them. Such systems and methods may receive programming information from one or more program guide sources, generate a media guidance application for display based upon the received programming information, receive behavior information from at least one further source, and generate parameters for modifying the media guidance application in response to the behavior information. The systems and methods may then modify the media guidance application based upon the generated parameters and display the modified media guidance application.

20 Claims, 16 Drawing Sheets

METHODS AND SYSTEMS FOR MODIFYING A MEDIA GUIDANCE APPLICATION BASED ON USER DATA

CROSS-REFERENCE TO RELATED APPLICATION

This application is a continuation of U.S. patent application Ser. No. 17/954,782, filed Sep. 28, 2022, the disclosure of which is hereby incorporated by reference herein in its entirety.

BACKGROUND

The present disclosure relates to methods and systems for modifying a media guidance application based upon information received about a user's media consumption habits across multiple media platforms. Particularly, but not exclusively, the present disclosure relates to modifying a media guidance application in dependence upon data about the behavior of a user in a different media environment, and/or determining a media environment in which a user has consumed media is of most relevance.

SUMMARY

The general concept of learning user preferences and using those preferences to personalize the user's interaction with various service providers and interactions with content query systems, e.g., to better find results to queries provided by the user and to ordering the results for presentation to the user, is understood. For example, previous systems and methods have been proposed which may select and present content on a first system based on user preferences learned on a second system.

In general, such systems and methods are confined to systems which are delivered over-the-top, and it is common today to see recommendations based on content consumed via various services that a user has accessed or subscribed to. For example, TV streaming devices may allow users to watch content from various over-the-top services, and the streaming devices may share information with a variety of other over-the-top services. These services may share information with a content aggregation service, if the user allows it, so that the streaming device may recommend content to watch based on content consumed on these other services.

Systems and methods are provided herein for modifying a media guidance application. Such systems and methods may aid a user in selecting media content for viewing which may be of particular interest to them. Such systems and methods may receive programming information from one or more program guide sources, generate a media guidance application for display based upon the received programming information, receive behavior information from at least one further source, and generate parameters for modifying the media guidance application in response to the behavior information. The systems and methods may then modify the media guidance application based upon the generated parameters and display the modified media guidance application.

According to some examples of the systems and methods provided herein, generating parameters for modifying the media guidance application may further include analyzing the behavior information based upon a recommendation model.

According to some examples of the systems and methods provided herein, the recommendation model may include weightings assigned to the behavior information, with the weightings determined based upon one or more predetermined factors.

In some examples, receiving the behavior information may include receiving information about media which has been consumed by a user.

In some examples, modifying the media guidance application may include modifying at least one program listing in the media guidance application such that the at least one modified program listing appears differently in the media guidance application.

According to some examples of the systems and methods provided herein, receiving behavior information includes receiving information about the duration of consumption of media by a user and/or information about the at least one platform on which a user consumed media.

In some examples, the information about the at least one platform on which a user consumed media may include information about two or more platforms on which the user consumed media.

According to some examples of the systems and methods provided herein, the systems and methods may determine which platform of the two or more platforms on which the user consumed media is of most relevance, and receive media consumption information from the platform of most relevance. The systems and methods may generate, based upon the received media consumption information, further parameters for modifying the media guidance application, and modify the media guidance application based upon the further parameters. The systems and methods may modify at least one program listing in the media guidance application such that the at least one modified program listing appears differently in the media guidance application.

In some examples, the systems and methods may modify the media guidance application which may include displaying at least one advertisement in the media guidance application.

According to some examples of the systems and methods provided herein, the systems and methods may determine whether a user is entitled to view a media item, and in response to a determination that the user is entitled to view the media item, may select an alternative media item and repeat the step of determining, using control circuitry, whether a user is entitled to view the media item, and in response to a determination that the user is not entitled to view the media item, the systems and methods may generate an advertisement for the media item and display the advertisement in the media guidance application.

According to some examples of the systems and methods provided herein, the systems and methods may receive from at least one data source, information about at least one item of media content which is available on a platform, wherein the information includes at least metadata which describes the media content and information about the date until which the at least one item of media content will be available on the platform, and receive information about the current date and time. The systems and methods may determine a pre-expiry time threshold, and may also determine, in response to the behavior information and the metadata, whether the at least one item of media content is to be considered; and if it is determined that the at least one item of media content is to be considered, the systems and methods may further determine, by comparing the information about the date until which the item of media content will be available on the platform and the current date and time, an availability period, and if the availability period is less than or equal to the pre-expiry time threshold, the systems and methods may modify at least one program listing in the media guidance application such that the at least one modified program listing appears differently in the media guidance application.

In some examples, receiving user behavior may further include receiving information about the behavior of multiple users, and determining, in response to the behavior information, may further include determining further recommendation parameters in response to the information about the behavior of multiple users.

In some examples, one or more parameters of the media content item are received. For example, the media content item may be an audio recording which is delivered by an audio distribution platform, and the media content item may be a podcast. In another example, the media content item may be an item of multimedia content delivered via a streaming service, and may be an episode of a television show.

According to some examples of the systems and methods provided herein, the systems and methods may receive one or more parameters of a media content item and determine, based upon the received behavior information, at least one recommendation parameter. Further, the systems and methods may determine, by comparing the one or more parameters of the media content item and the at least one recommendation parameter, whether the media content item is to be considered, and on a determination that the media content item is to be considered, the systems and methods may modify at least one program listing in the media guidance application such that the at least one modified program listing appears differently in the media guidance application.

Systems and methods are also provided herein for determining whether to record content, and such systems and methods may receive programming information from one or more program guide sources and store the received programming information. The systems and methods may also receive user behavior information from at least one further source and determine parameters for recording in response to the behavior information, and may also determine whether to record a program, based on the parameters for recording, and may record the program.

Systems and methods are also provided herein for generating a content recommendation, and such systems and methods may receive information regarding consumption of media in a first media delivery environment, receive information regarding consumption of media in a second media delivery environment, the information regarding consumption of media in the first and second media delivery environments includes time spent and/or the last time accessed. The systems and methods may determine, in response to the information regarding consumption of media in the first and second media delivery environment, a media consumption profile for each of the first and second media delivery environment, and may also determine based on the consumption profile for the first and second media delivery environments, the media delivery environment of most relevance and selecting the media delivery environment of most relevance. The systems and methods may also generate at least one content recommendation based upon media viewed in the selected delivery environment.

In some examples, the systems and methods may receive context information which describes a type of content for which a user is searching; and may determine, in response to the context information, at least one content parameter. In some examples the step of determining, based on the consumption profile for the first and second media delivery environments, further includes a determination based upon the at least one content parameter.

In some examples generating the at least one content recommendation further includes analyzing the behavior information based upon a recommendation model.

According to some examples, the recommendation model includes weightings assigned to the behavior information, and the weightings are determined based upon one or more predetermined factors.

In some examples, the step of generating the at least one content recommendation includes generating, for display, at least one advertisement along with the at least one content recommendation.

In some examples, providing a content recommendation may include determining, using control circuitry, whether a user is entitled to view a media item, and in response to a determination that the user is entitled to view the media item, selecting an alternative media item and repeating the step of determining whether a user is entitled to view the media item, and in response to a determination that the user is not entitled to view the media item, recommending the media item in the at least one content recommendation.

According to some examples, generating a content recommendation may include receiving, from at least one data source, information about at least one item of media content which is available on a platform, wherein the information includes at least metadata which describes the media content and information about the date until which the at least one item of media content will be available on the platform, receiving information about the current date and time, determining a pre-expiry time threshold, determining in response to the behavior information and the metadata, whether the at least one item of media content is to be considered, and on determining that the at least one item of media content is to be considered, determining by comparing the information about the date until which the item of media content will be available on the platform and the current date and time, an availability period, and if the availability period is less than or equal to the pre-expiry time threshold, modifying the at least one content recommendation.

In some examples, receiving information about media consumption in the first and second media delivery environments further comprises receiving information about the behavior of multiple users.

According to some examples, the method further comprises: receiving information regarding consumption of media in a third media delivery environment, wherein the information regarding consumption of media in the third media delivery environment includes time spent, last time accessed.

According to some examples, providing a content recommendation may include determining, in response to the information regarding consumption of media in the third media delivery environment, a media consumption profile for the third media delivery environment, and determining, based on the consumption profile for the first, second, and third media delivery environments, the media delivery environment of most relevance and selecting the media delivery environment of most relevance.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
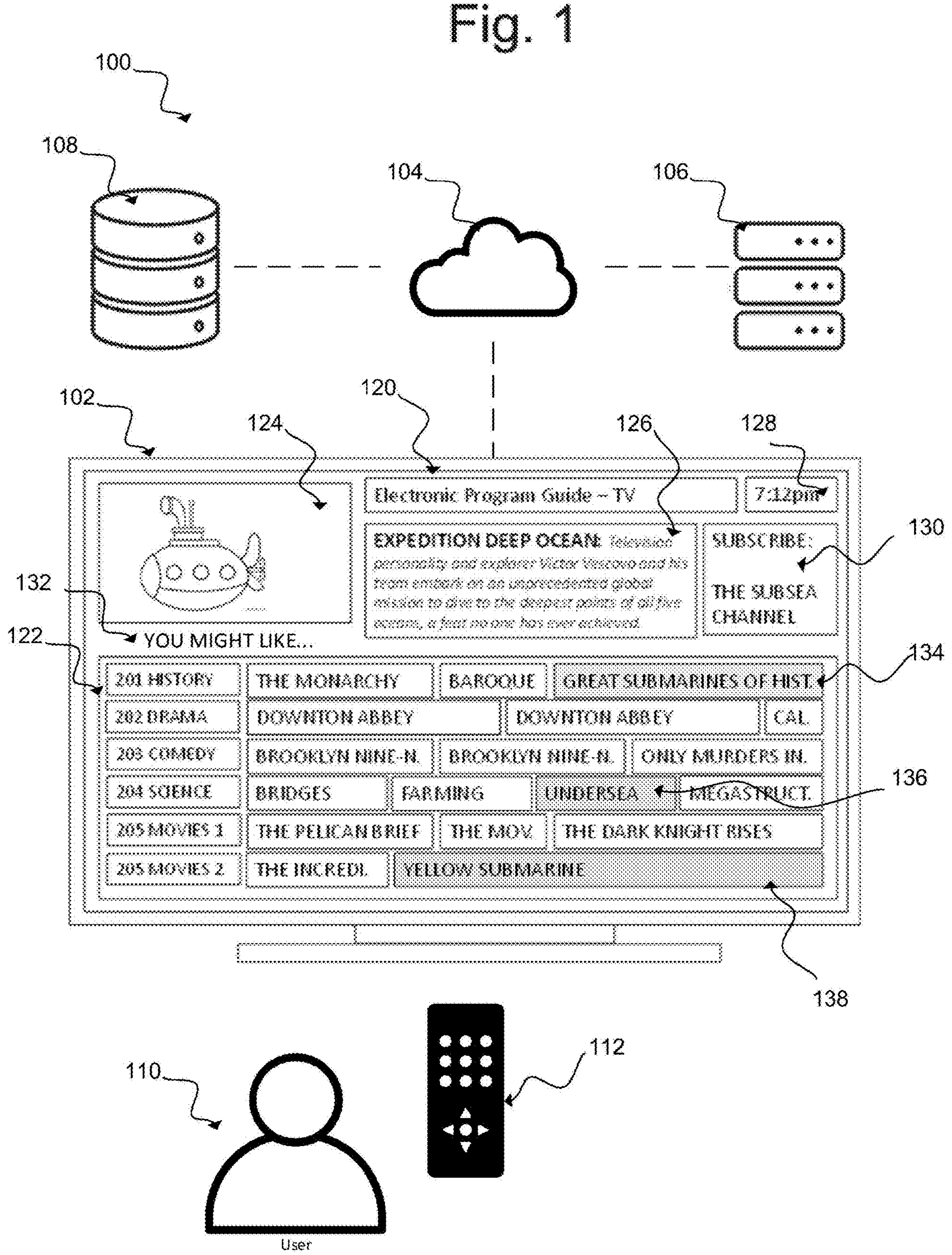
FIG. 1 illustrates an overview of a system for modifying a media guidance application based upon information received about a user's media consumption habits across multiple media platforms, in accordance with some examples of the disclosure.
Figure 2:
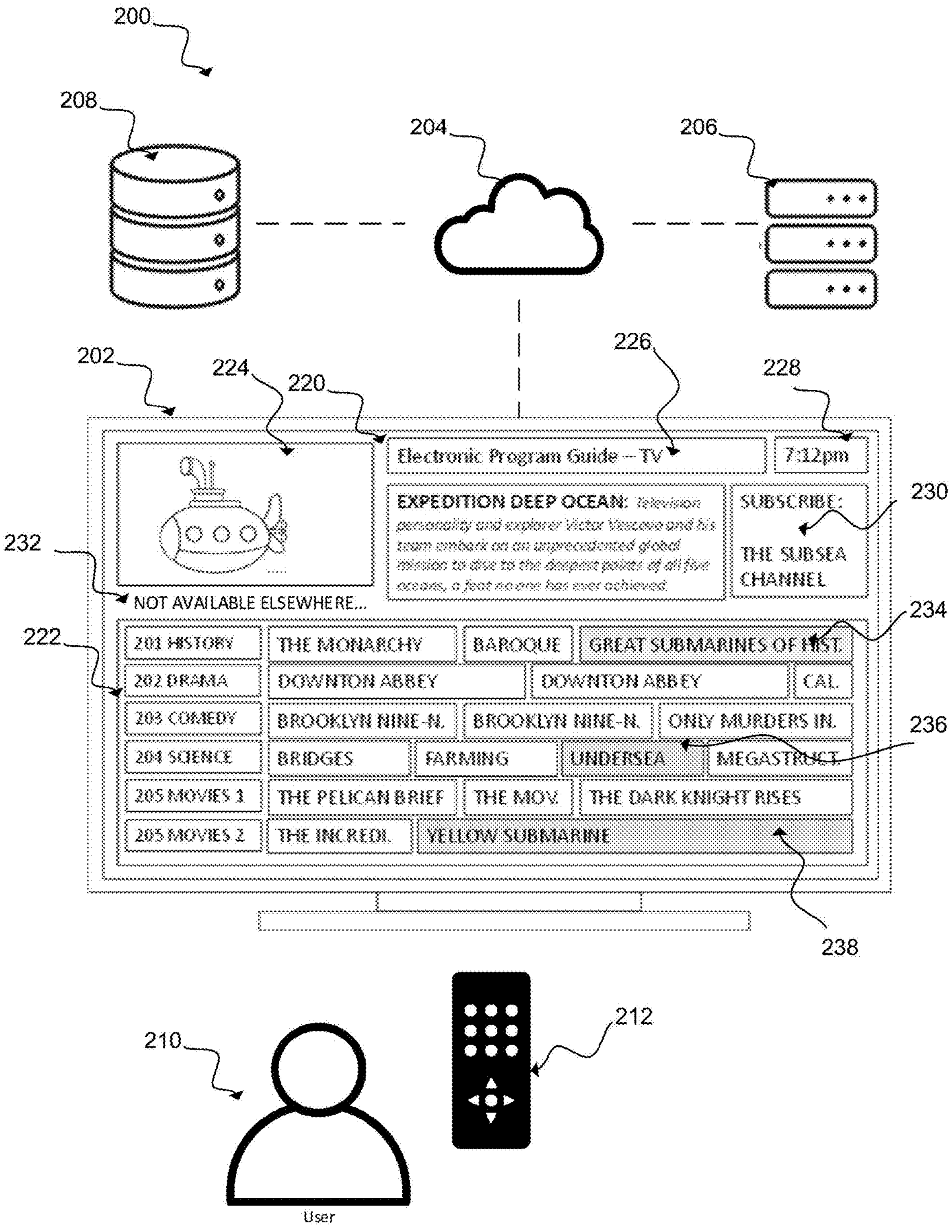
FIG. 2 illustrates an overview of a system for modifying a media guidance application based upon information received about a user's media consumption habits across multiple media platforms, in accordance with some examples of the disclosure.

FIGS. 1 and 2 illustrate an overview of systems 100, 200 for modifying a media guidance application, e.g. by identifying programs which may be of interest to a viewer, in accordance with some examples of the disclosure.

In some examples, systems 100, 200 each include a user device 102, 202, such as a tablet computer, a smartphone, a smart television, or the like, configured to display media content to one or more users. Systems 100, 200 may also each include network 104, 204 such as the Internet, configured to communicatively couple the user device 102, 202 to one or more servers 106, 206 and/or one or more content databases 108, 208 from which media content may be obtained for display on the user device 102, 202. User device 102, 202 and server 106, 206 may be communicatively coupled to one another by way of network 104, 204 and server 106, 206 may be communicatively coupled to content database 108, 208 by way of one or more communication paths, such as a proprietary communication path and/or network 104, 204.

In some examples, systems 100, 200 may each comprise an application that provides guidance through an interface, e.g., a graphical user interface, that allows users to efficiently navigate media content selections, navigate an interactive media content item, and easily identify media content that they may desire, such as content provided on a database on one or more live streams. Such guidance is referred to herein as an interactive content guidance application or, sometimes, a content guidance application, a media guidance application, or a guidance application.

In an example, a media guidance application for a live TV service may modified based on metadata associated with content consumed on other sources. Such other sources may include third party applications that are not owned or operated by the provider of the live media guidance application which contains channel ID and time slots. For example, a cloud-based media guidance that can be accessed from a Digital Video Recorder ('DVR') or a Set-Top Box ('STB') which has no recording capability may highlight or visually distinguish individual listings within the media guidance application. Such highlighting may carried out by way of any suitable means, and in an example, this may include coloring the cell in the media guidance application if the listing is related to content that a user consumed or continues to consume, for example episodes of a television series on a different service such as an over-the-top streaming application.

Modifying a media guidance application in this way may allow users to find content to consume in a quick and convenient fashion and may also act as a discovery tool to find new content to watch that is related to content the user consumes on other platforms but are not identical; that is to say that the media is not the same movie or TV series. For example, the relationship could be based on genre, actors/actresses, general synopsis, or the like.

In another example, only media items which are not available on other sources such as those described above may be visually distinguished for the user. This may, in some examples, include modifying a media guidance application in such a way that a section is generated within the media guidance application which includes the listings that are related to content consumed on other platforms. This may, for example, be titled in such a way that it is easily discerned that the listings have been collated in such a way, and may be entitled as being related to content the user has consumed on an over-the-top service. A user may access over-the-top applications on the same terminal, which may include the DVR or STB described above, on which they access their live TV service. It is therefore possible that a user may authorize the sharing of viewing history between the various services which are accessed on the terminal.

It is known that some services automatically record content which it is deemed may be of interest to a user. Such services do not, however into account that the user might already have access to such content via other services. In some examples described herein, an auto-recording feature may only record content that is not accessible on the other services that the user is subscribed to or have access to.

In some cases, recommendations may be based on or biased towards the last content system that the user spent time on, which may for example be the platform on which the user watched a movie or TV series. Such an approach may require assigning different weights to the various sources and such weights are dynamic based on last access and time spent consuming content from such a source. The sources may include linear TV, over-the-top services which may be both live and on-demand, video-sharing websites and platforms, and such like.

Recommendations for media may also be based on factors such as the type of device the user is accessing the source or platform from, the user's entitlements, the suitability of the content, the content expiration date, the current user's subscriptions which may include packages the user is subscribed to on the service that's being accessed at that point. It may be at this point where such recommendations may be shown. In some cases, licenses restrict viewing the content on specific device types; as well as in-home vs out-of-home network which means a user may only view the content if they are connected to their home network, and/or geo-restrictions. When considering the suitability of content, it may for example be based on whether a user watches specific genres of content on their phone, and may also be based on current device status, which may for example include information about whether the device is connected to Wi-Fi with strong signal or connected to a mobile network, and information about the device battery level, temperature, location, and such like.

In some examples, showing related content that's about to be removed from the catalogue or service may be implemented. Such an approach may use the systems and methods described herein.

In some cases, a recommendation may depend upon the last two sources accessed by a user. For example, these last two sources may be different over-the-top services. If the first source would not yield enough content recommendations, for example the number of recommendations does not exceed a threshold), a second source may be considered. This may, for example, be the second source on a list of most recently-accessed sources. If the content consumed on the second source includes features which are different from the features on the first source which was used in the original search and did not yield enough results, the two results may be combined such that the user may be provided with a greater number of recommendations.

In some cases, the two most recently-accessed sources may not provide sufficient data for recommendation. Information from the third source on the list of ranked sources may be used, if necessary, and this may continue down a list of most-recently accessed sources. In some examples, this may be carried out in real-time based on the user's behavior. For example if the user is browsing and has not selected something for playback or viewing, this method may be employed to provide the user with more recommendations. In the case that the two most recently-accessed sources give the same recommendations, both of the two most recently-accessed sources may be used from the outset.

In some cases, a user's current browsing 'context' context may be used. For example, if a user is seeking to rent a movie then related content from any known source where the user consumed content may be prioritized, such as movies which are available for rentals. If, for example, the user is browsing on-demand or live guide, then content which is available for free on-demand or live may be prioritized.

In some examples, systems 100, 200 may each comprise an application that provides guidance through an interface, e.g., a graphical user interface, that allows users to efficiently navigate media content selections, navigate an interactive media content item, and easily identify media content that they may desire, such as content provided on a database on one or more live streams. Such guidance is referred to herein as an interactive content guidance application or, sometimes, a content guidance application, a media guidance application, or a guidance application. In some examples, the application may be configured to provide a recommendation for a content item, e.g. based upon information about content which a user has consumed on another media delivery platform, e.g. an over-the-top service.

Interactive media guidance applications may take various forms, depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset", "content items" and "content" should each be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate amid and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the examples discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media card, register memory, processor cache, random access memory (RAM), etc.

With the ever-improving capabilities of the Internet, mobile computing, and high-speed wireless networks, users are accessing media on user equipment devices on which they traditionally did not. As referred to herein, the phrases "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some examples, the user equipment device may have a front-facing screen and a rear-facing screen, multiple front screens, or multiple angled screens. In some examples, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as online applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data", "guidance data", and "programming information" should be understood to mean any data related to content or data used in operating the guidance application. For example, the guidance data may include program information, subtitle data, guidance application settings, user preferences, user profile information, media listings, media-related information (e.g., broadcast times, broadcast channels, titles, descriptions, ratings information (e.g., parental control ratings, critics' ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Program guide sources may include any source which may be used to populate the electronic program guide with guidance data or programming information and such sources may be provided by the service provider. In an example, information about a program may include electronic program guide information from the service provider, and may be added to or augmented with data from a third party information service. Such a third party information service may be an online movie and television show ratings and review database and may provide additional information in the programming information.

Figure 3:
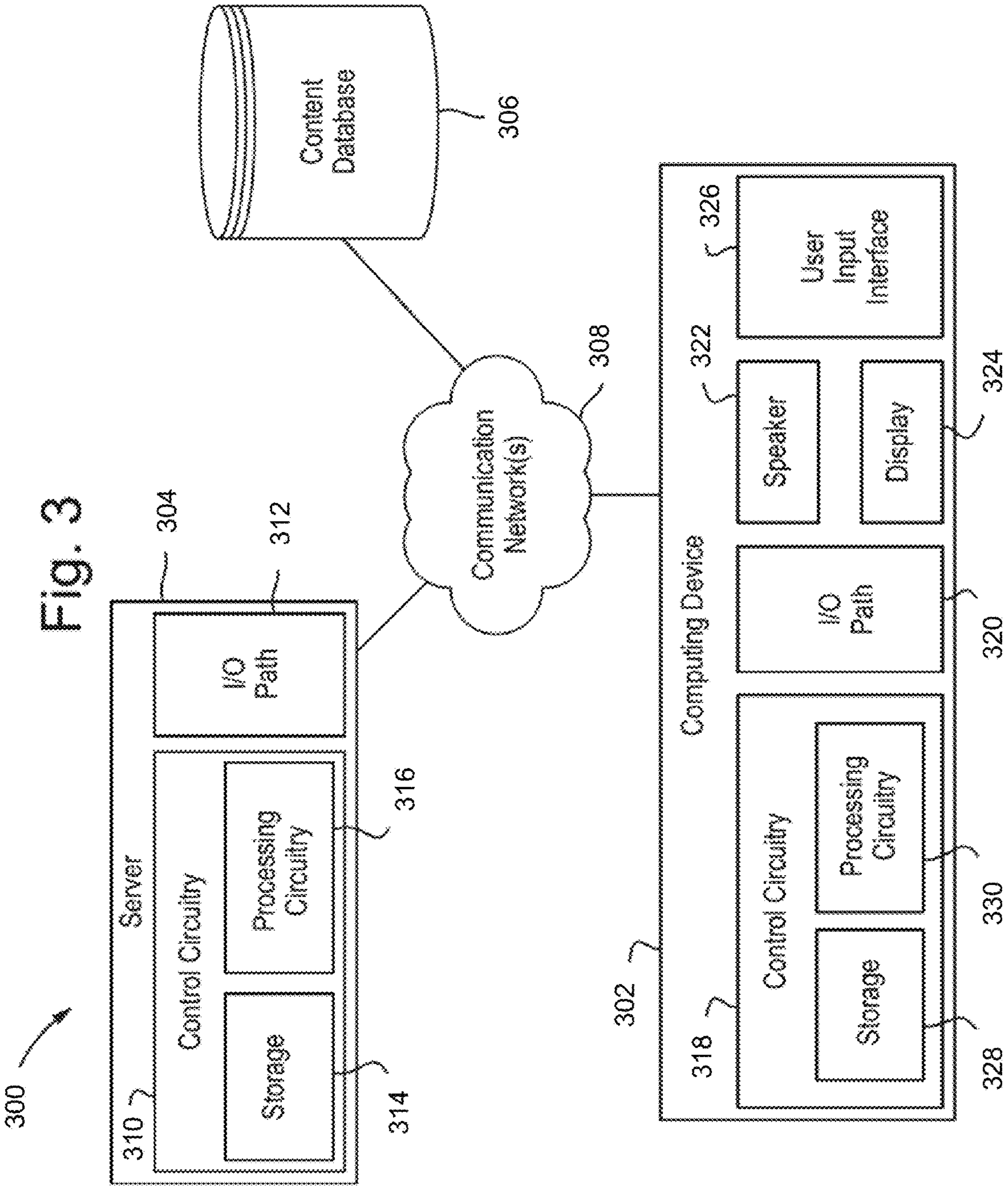
FIG. 3 is a block diagram showing components of an exemplary system for modifying a media guidance application based upon information received about a user's media consumption habits across multiple media platforms, in accordance with some examples of the disclosure.

FIG. 3 is an illustrative block diagram showing exemplary system 300 configured to display media content. Although FIG. 3 shows system 300 as including a number and configuration of individual components, in some examples, any number of the components of system 300 may be combined and/or integrated as one device, e.g., as user device 102. System 300 includes computing device 302, server 304, and content database 306, each of which is communicatively coupled to communication network 308, which may be the Internet or any other suitable network or group of networks. In some examples, system 300 excludes server 304, and functionality that would otherwise be implemented by server 304 is instead implemented by other components of system 300, such as computing device 302. In still other examples, server 304 works in conjunction with computing device 302 to implement certain functionality described herein in a distributed or cooperative manner.

Server 304 includes control circuitry 310 and input/output (hereinafter "I/O") path 312, and control circuitry 310 includes storage 314 and processing circuitry 316. Computing device 302, which may be a personal computer, a laptop computer, a tablet computer, a smartphone, a smart television, a smart speaker, or any other type of computing device, includes control circuitry 318, I/O path 320, speaker 322, display 324, and user input interface 326, which in some examples provides a user selectable option for enabling and disabling the display of modified subtitles. Control circuitry 318 includes storage 328 and processing circuitry 330. Control circuitry 310 and/or 318 may be based on any suitable processing circuitry such as processing circuitry 316 and/or 330. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 314, storage 328, and/or storages of other components of system 300 (e.g., storages of content database 306, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 314, storage 328, and/or storages of other components of system 300 may be used to store various types of content, metadata, and or other types of data. Non-volatile memory may also be used (e.g., to launch a boot-up routine and other instructions). Cloud-based storage may be used to supplement storages 314, 328 or instead of storages 314, 328. In some examples, control circuitry 310 and/or 318 executes instructions for an application stored in memory (e.g., storage 314 and/or 328). Specifically, control circuitry 314 and/or 328 may be instructed by the application to perform the functions discussed herein. In some implementations, any action performed by control circuitry 314 and/or 328 may be based on instructions received from the application. For example, the application may be implemented as software or a set of executable instructions that may be stored in storage 314 and/or 328 and executed by control circuitry 314 and/or 328.

In some examples, the application may be a client/server application where only a client application resides on computing device 302, and a server application resides on server 304.

The application may be implemented using any suitable architecture. For example, it may be a stand-alone application wholly implemented on computing device 302. In such an approach, instructions for the application are stored locally (e.g., in storage 328), and data for use by the application is downloaded on a periodic basis (e.g., from an out-of-band feed, from an Internet resource, or using another suitable approach). Control circuitry 318 may retrieve instructions for the application from storage 328 and process the instructions to perform the functionality described herein. Based on the processed instructions, control circuitry 318 may determine what action to perform when input is received from user input interface 326.

In client/server-based examples, control circuitry 318 may include communication circuitry suitable for communicating with an application server (e.g., server 304) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 308). In another example of a client/server-based application, control circuitry 318 runs a web browser that interprets web pages provided by a remote server (e.g., server 304). For example, the remote server may store the instructions for the application in a storage device. The remote server may process the stored instructions using circuitry (e.g., control circuitry 310) and/or generate displays. Computing device 302 may receive the displays generated by the remote server and may display the content of the displays locally via display 324. This way, the processing of the instructions is performed remotely (e.g., by server 304) while the resulting displays, such as the display windows described elsewhere herein, are provided locally on computing device 302. Computing device 302 may receive inputs from the user via input interface 326 and transmit those inputs to the remote server for processing and generating the corresponding displays.

A user may send instructions, e.g., to view an interactive media content item and/or select one or more programming options of the interactive media content item, to control circuitry 310 and/or 318 using user input interface 326. User input interface 326 may be any suitable user interface, such as a remote control, trackball, keypad, keyboard, touchscreen, touchpad, stylus input, joystick, voice recognition interface, gaming controller, or other user input interfaces. User input interface 326 may be integrated with or combined with display 324, which may be a monitor, a television, a liquid crystal display (LCD), an electronic ink display, or any other equipment suitable for displaying visual images.

Server 304 and computing device 302 may transmit and receive content and data via I/O path 312 and 320, respectively. For instance, I/O path 312 and/or I/O path 320 may include a communication port(s) configured to transmit and/or receive (for instance to and/or from content database 306), via communication network 308, content item identifiers, content metadata, natural language queries, and/or other data. Control circuitry 310, 318 may be used to send and receive commands, requests, and other suitable data using I/O paths 312, 320.

Returning to FIG. 1 and FIG. 2, a user 110, 210 may interact with a media guidance application 120, 220. The media guidance application may be generated from data received via network 104, 204 such as the Internet, from the one or more servers 106, 206 and/or the one or more content databases 108, 208. The media guidance application may receive inputs from the user 110, 210, via remote control 112, 212. Remote control 112, 212 may be connected with the user device 102, 202. In some examples, the remote control 112, 212 may be a remote control handset, and in some examples the remote control 112, 212 may be a multifunction remote control, a tablet computer, a touch-screen mobile device, or any other suitable type of device.

As can be seen in FIG. 1 and FIG. 2, the media guidance application 120, 220 may provide a listing or listings of programs available for viewing. In FIG. 1 and FIG. 2, there is shown a channel listing 122, 222 in the lower portion of the media guidance application 120, 220. In the example shown, the channel listing 122, 222 may be scrolled through, with a selection of channels and programs shown at any one time. The media guidance application 120, 220 may also include a channel preview 124, 224 of the channel to which the user device 102, 202 may be tuned. In the example shown in FIG. 1 and FIG. 2, the user device 102, 202 is tuned to a program which is about deep ocean exploration, and the channel is presently displaying a submarine. A program description 126, 226 may also be shown on the media guidance application 120, 220. In the example shown in FIG. 1 and FIG. 2, the current time 128, 228 is also shown in the corner of the media guidance application 120, 220. The media guidance application shown in FIG. 1 and FIG. 2 also includes a channel advertisement 130, 230 for a channel to which a user may subscribe.

As shown in FIG. 1, three items in the channel listing 122 are highlighted. The media guidance application 120 also includes banner 132 which states 'YOU MIGHT LIKE . . . '. The highlighted items in the channel listing 122 are recommended programs 134, 136, 138. These programs may be recommended by way of techniques described herein. The recommended programs 134, 136, 138 all, in the example shown in FIG. 1, relate to underwater-related subjects, and these recommended programs 134, 136, 138 may relate to content that the user 110 has watched on another platform, which may be an over-the-top streaming platform. In the example shown in FIG. 1, the user 110 may have viewed programming or media content about undersea vehicles, exploration, or submarines, and the media guidance application may be modified based upon this information in line with the techniques described herein.

The channel advertisement 130 shown in FIG. 1 is for a channel to which the user 110 may subscribe, and also relates to content that the user has watched on another platform, which may be an over-the-top streaming platform. The channel advertisement 130 is an advertisement tailored specifically to the user 110, based upon the recommendation techniques described herein. The channel advertisement 110 may be replaced with alternative advertising, in dependence upon a recommendation or recommendations obtained by way of techniques described herein. The performance of the channel advertisement 110 may also be measured in dependence upon a reaction thereto by the user 110, with such information stored for later use.

Returning to a discussion of the channel listing 122 and the recommended programs 134, 136, 138, the channel listing 122 may be modified so as to draw the user's attention thereto. The modification may be a change in color, a change in shape, a change in font, or any suitable amendment to the channel listing 122 such that the attention of the user 110 would be drawn thereto. In some cases, the recommended programs 134, 136, 138 may be automatically recorded in the case that the user equipment 102 includes DVR capability.

As shown in FIG. 2, three items in the channel listing 222 are highlighted. The media guidance application 220 also includes banner 232 which states 'NOT AVAILABLE ELSEWHERE . . . '. The highlighted items in the channel listing 222 are recommended programs 234, 236, 238. These programs may be recommended by way of techniques described herein. The recommended programs 234, 236, 238 all, in the example shown in FIG. 2, relate to underwater-related subjects, and these recommended programs 234, 236, 238 may relate to content that the user 210 has watched on another platform, which may be an over-the-top streaming platform. In a similar fashion to the example shown in FIG. 1, in the example shown in FIG. 2, the user 210 may have viewed programming or media content about undersea vehicles, exploration, or submarines, and the media guidance application may be modified based upon this information in line with the techniques described herein.

The example shown in FIG. 2 differs from that shown in FIG. 1 in that the recommended programs 234, 236, 238 have been determined as not being available on any other service to which the user 210 has access. This determination may have been made using the recommendation techniques described herein. In the example shown in FIG. 2, an advertisement 230 is included in the media guidance application 220. The advertisement 230 may be an advertisement for a channel to which the user 210 does not subscribe, as described above in relation to FIG. 1. The advertisement 230 may, in some examples, be for pay-per-view content, or may be any sort of advertisement which may have been selected based upon the recommendation techniques described herein.

In some examples, further advertising may be inserted into the media guidance application 220 shown in FIG. 2 and the media guidance application 120 of FIG. 1, but is not shown in FIG. 1 or FIG. 2. Such advertising may be in the form of multimedia content, video content, text content, a static image, an animation, or any suitable form of content. The advertising may be selected for display in the media guidance application 120, 200 by way of the recommendation techniques described herein.

Advertising may also be inserted into streamed video or used for advertising recommendations in a streaming video. The advertising may be inserted before the content of the streamed video ('pre-roll'), during the streamed video ('mid-roll'), or overlaid upon the streamed video. The advertising may be interactive.

The recommendation techniques described herein for modifying a media guidance application may obtain data from network 104, 204, one or more servers 106, 206, and/or one or more content databases 108, 208. The media guidance application may be delivered via network 104, 204, or may be delivered wirelessly, over-the-air, or via a television distribution platform, which may be broadcast. Information about media the user 110, 210 has consumed on other services may be collected by user equipment 102, 202, or may be consumed by another device on which the user 110, 210 may access such other services. Information collected by the user equipment 102, 202 may be communicated via network 104, 204, to one or more servers 106, 206, and/or one or more content databases 108, 208.

The user equipment 102, 202 may include DVR functionality, and may record or store programming thereon. Such programming may be selected for recording based upon content that the user 110, 210 has watched on another platform, which may be an over-the-top streaming platform.

Figure 4:
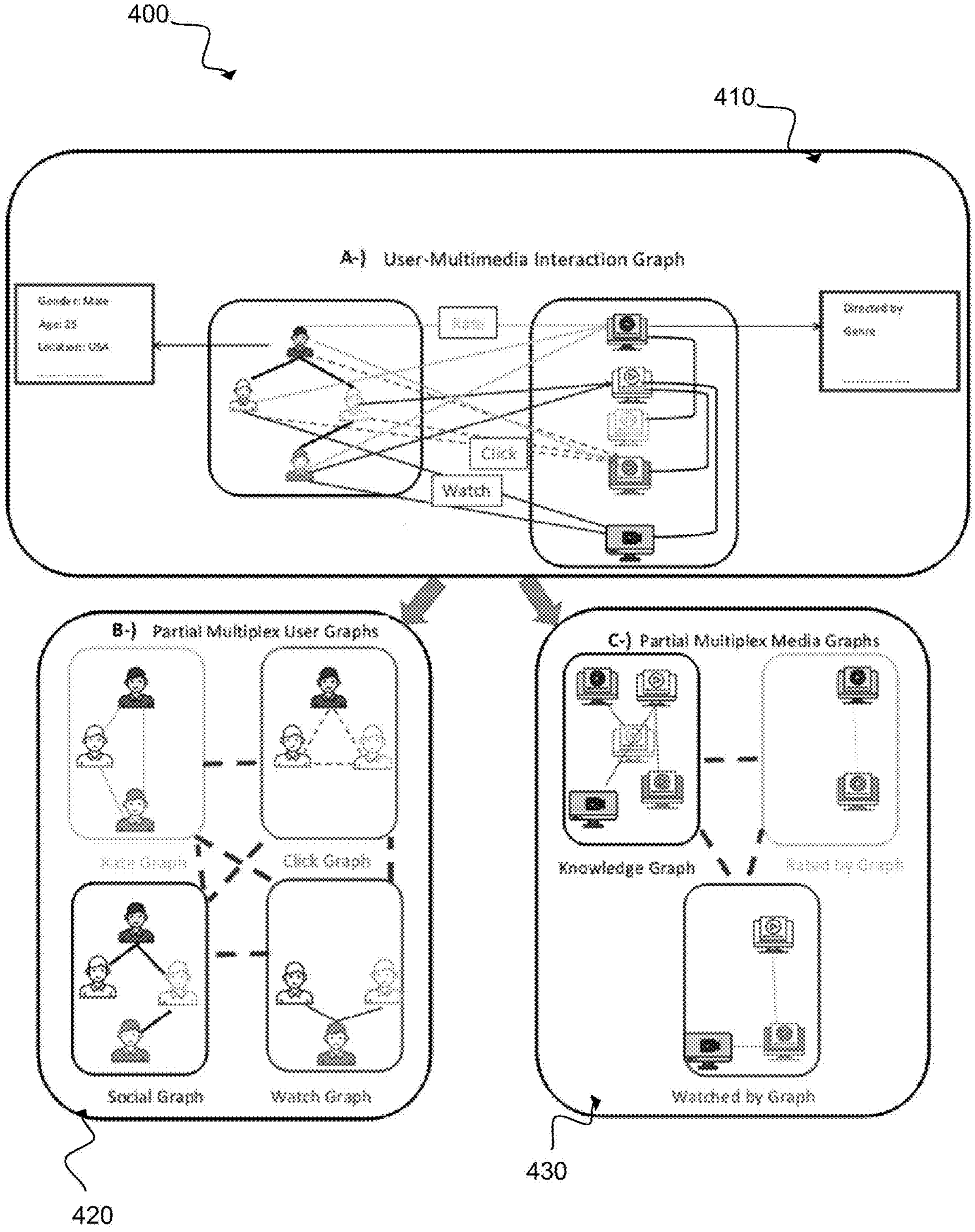
FIG. 4 shows a user-multimedia heterogenous interaction graph for providing a media recommendation, in accordance with some examples of the disclosure.

FIG. 4 shows a user-multimedia heterogenous interaction graph 400. To provide efficient recommendations of items to users across multiple domains, consumer behavior prediction approaches may be applied. Multi-domains may be defined in categories which include multi domains sharing users, multi domains sharing items, multi domains sharing content type, and multi domains belonging to a super domain. These will be discussed in more detail later.

In multimedia digital platforms such as video sharing platforms or over-the-top media streaming platforms, a user may interact with multimedia content, e.g. videos, by watching, subscribing, liking/disliking and so forth. Such videos may be related to one another by way of content similarity, those who have watched the video, and such like. In addition to videos being related to one another in this way, users may share information such as location, gender, age, and such like. Users may also interact with one another across multiple domains, which may include social networks, e-commerce systems, online gaming platforms, digital multimedia platforms, and the like.

In an exemplary multimedia digital platform, users, multimedia content, denoted as items, and their interactions may be stated as a heterogeneous network or graph, in which users and videos are named as entities, shown as nodes, and their associations shown as edges.

In some examples, the multimedia content is an adaptive bitrate stream compatible with the MPEG-DASH standard, or other implementations such as Apple HLS. In some embodiments, the first stream of multimedia content is encoded at a first maximum bitrate and/or the first resolution. For example, the request may be a request for the next segment of an adaptive bitrate stream, and therefore the first stream of multimedia content is at a first maximum bitrate (or resolution) based on the first network bandwidth. In some examples, the second stream of multimedia content is encoded at a second maximum bitrate and/or a second resolution. For example, the request may be a request for the second segment of an adaptive bitrate stream, and therefore the second stream of multimedia content is at a second maximum bitrate (or resolution) based on new current network bandwidth, different from the first network bandwidth. The second stream may be a higher bitrate than the first stream, or vice versa, depending on the network bandwidth at the current time of the request.

In some examples, the media content is encoded using an adaptive bitrate streaming compatible codec. There are numerous examples of video codecs that are adaptive bitrate streaming compatible (e.g., x264, OpenH264, H.264/MPEG-4 AVC, which are all codecs compatible with the video format H.264). Moreover, there are numerous examples of video formats (e.g., H.264, H.265, VP9, AV1), each of which has numerous examples of video codecs.

As shown in the user-multimedia interaction graph 410 of FIG. 4, a user can interact with media items, such as videos with different means of interactions, such as "rate", "click", and "watch". Also, the users may interact with each other within a social network and they may share attribute information, such as age and location. Similarly, items themselves may interact with each other and have attribute information.

An example of these relationships are shown in the user-multimedia interaction graph 410. This example may be segregated further into partial views for users and media, with an example of a heterogeneous graph segregated into views for users in the partial multiplex user graph 420 of FIG. 4 and an example of a heterogenous graph segregated into views for media in the partial multiplex user graph 430 of FIG. 4. This may be based on edge types described above such as those described above, and may include "rate", "click", and "watch".

Exemplary techniques described herein may be used to predict consumer behaviors (and/or preferences, patterns) and recommend multimedia content (and/or any other items) to the users accordingly by using all types of interactions, connections and additional shared information (e.g., user and multimedia attributes) in multiple and heterogeneous domains, including social networks, e-commerce systems, online gaming platforms, and digital multimedia platforms. However, these heterogeneous graphs are not generally suitable for use directly used in Machine Learning models for predictive tasks, such as recommending multimedia content to a user, since heterogeneous graphs are too sparse. Such sparseness may give rise to two major problems which may be summarized as forcing a Machine Learning model to learn putting no associations among the entities of graphs (learning to favour sparsity pattern in the data), and high cost computational complexity to train Machine Learning models. To seek to ameliorate these issues, techniques in the present disclosure seek to feed the Machine Learning models with a compact representation of heterogeneous graphs for more accurate multimedia content recommendation and user behavior prediction. Such heterogenous graphs will be described in more detail later.

The present disclosure seeks to address these challenges by defining them in a mathematical formulation and provides methods/systems that learn a compact matrix representation from heterogeneous networks or graphs accordingly. This compact representation matrix may then be used in Machine Learning models for more accurate consumer behavior prediction and recommendation. Machine Learning models fed by a compact representation matrix as described herein may produce more accurate recommendations compared to the existing studies. Some potential examples of how such improved recommendations are described below.

The proposed framework takes into account the fact that one domain may be more important than others for heterogeneous recommendation systems. For example, for a video recommendation task on a video sharing platform, an exemplary compact representation matrix may pinpoint the usefulness of "Subscribe", "Watch", and "Like", etc domains, while existing ones treat them equally, which might result in collecting unnecessary information in the compact representation matrix.

The exemplary compact representation matrix learnt by such methods and systems may leverage domain similarities even if they do not share any common nodes whereas existing matrices may treat each domain separately when they do not share any common nodes. For example, by using an over-the-top service "watch" domain, it may be possible to recommend videos in a video sharing platform even if the users of the over-the-top platform and the video sharing platform are completely different.

The exemplary compact representation matrix may distinguish the importance of common nodes across domains, while existing ones ignore the importance of common nodes. This is useful in recommendation because if a user is active in the "subscribe" domain of a video sharing platform and not active in the "like" domain thereof, and if the "subscribe" domain is more informative than the "like" domain in recommendation tasks, then suggesting videos to users that are similar to the user in the "subscribe" domain may be more accurate than suggesting videos to users that are similar to the user in the "like" domain.

The exemplary compact representation matrix may distinguish the importance of groups of nodes across domains, while existing ones ignore the importance of them. This is useful for recommendation systems for the same reason mentioned above by using collective user behaviors.

The present disclosure considers the cross-domain correlations/similarities in partial multiplex networks and incorporates the importance of domains and common nodes across domains into a graph representation learning framework. In particular, a compact representation matrix is designed to decide which domain is more informative than others and how transition from one domain to another should be carried out, when there is no one-to-one correspondence among the domains (incomplete data). Then, this integrated information matrix (association matrix among the nodes of an incomplete multi-domain graph) may be ready to use for non-linear (e.g., deep learning) and Linear Attributed Embedding approaches.

In general, the present disclosure proposes a unified framework for multi-domain incomplete heterogeneous networks and aligns the multi-domains accordingly and may be utilized in real-world machine learning applications, including consumer behavior prediction, and targeted advertising, multimedia content recommendation, ranking the most relevant multimedia content for a given user (or a group of users), etc.

Figure 5A:
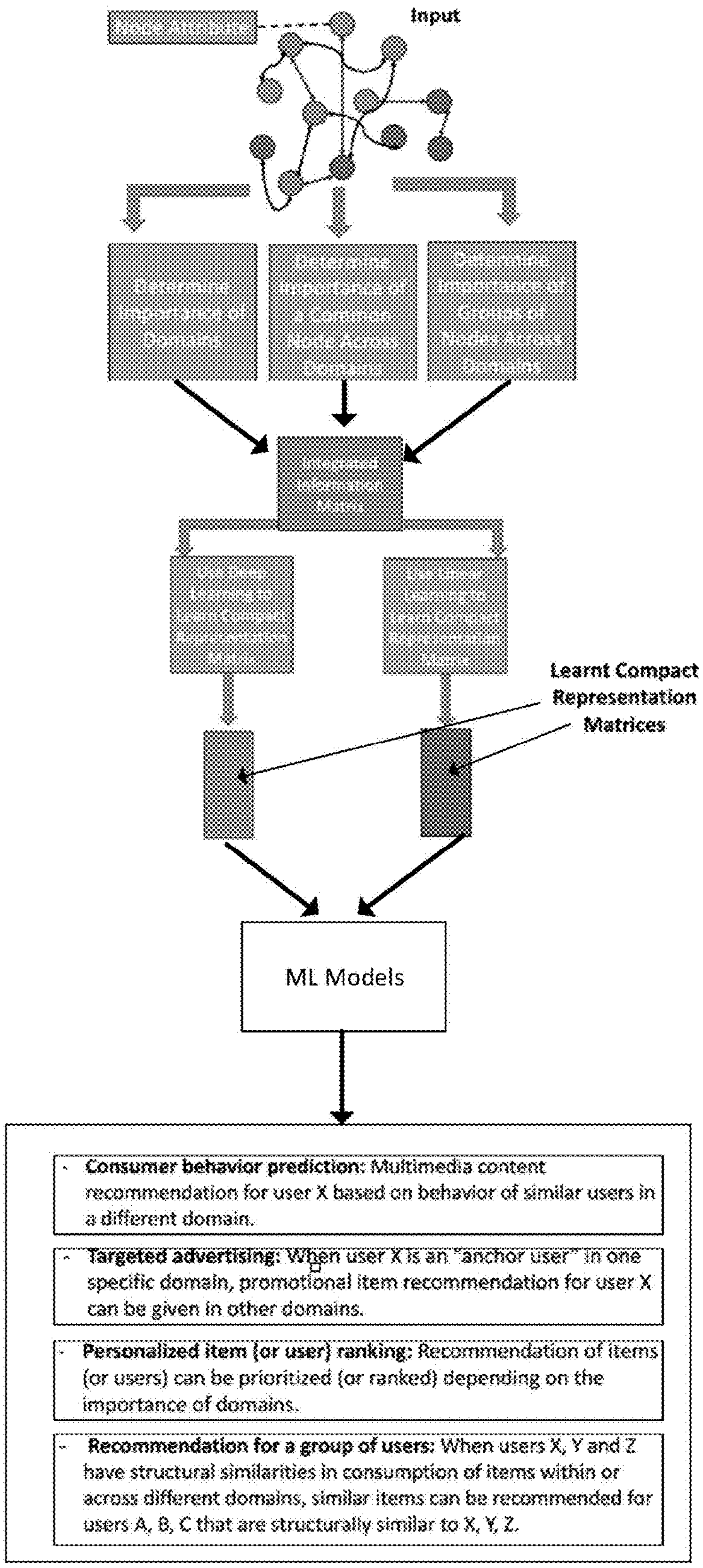
FIG. 5A a flowchart of an example of a methodology which may be used to provide a media recommendation in accordance with some examples of the disclosure.

FIG. 5A shows a flowchart of an example of a methodology which follows the techniques described herein. In this invention disclosure, it is important to note that the exemplary embodiments and use-cases are generally explained in terms of specific applications, methods and systems with specific implementations. However, the proposed methods and systems can also operate effectively in other implementations. Therefore, the present disclosure is not limited to the exemplary embodiments and use-cases described in this disclosure, but can be applied to the widest scope.

FIG. 5A shows an exemplary schematic representation of how users may relate to each other by various relationship types. In an example, a user may view the same video or buy the same book. Thus, these relationships may be used to build a relationship among items as well. For example, the first video and the second video are both rated by the same person, and thus the first and second video has what may be referred to as a rated by relationship. These relationships may be used to build a heterogeneous graph which summarizes all types of relationships, and may be used with the techniques described herein.

Figure 5B:
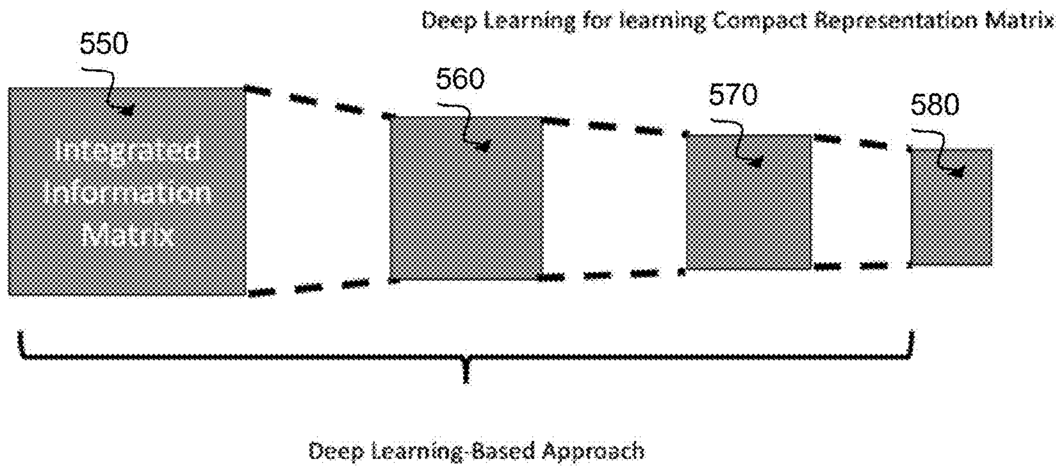
FIG. 5B shows an exemplary schematic representation of the reduction of an integrated information matrix into a compact representation matrix which may be used to provide a media recommendation in accordance with some examples of the disclosure.

FIG. 5B shows an exemplary schematic representation of the reduction of an integrated information matrix into a compact representation matrix, through the use of Machine Learning techniques. The input integrated information matrix 550 is reduced to the compact representation matrix 580. In the example shown in FIG. 5B, intermediate stages 560 and 570 are passed through. The integrated information matrix 550 of FIG. 5B may be processed in accordance with the techniques described herein.

Figure 6A:
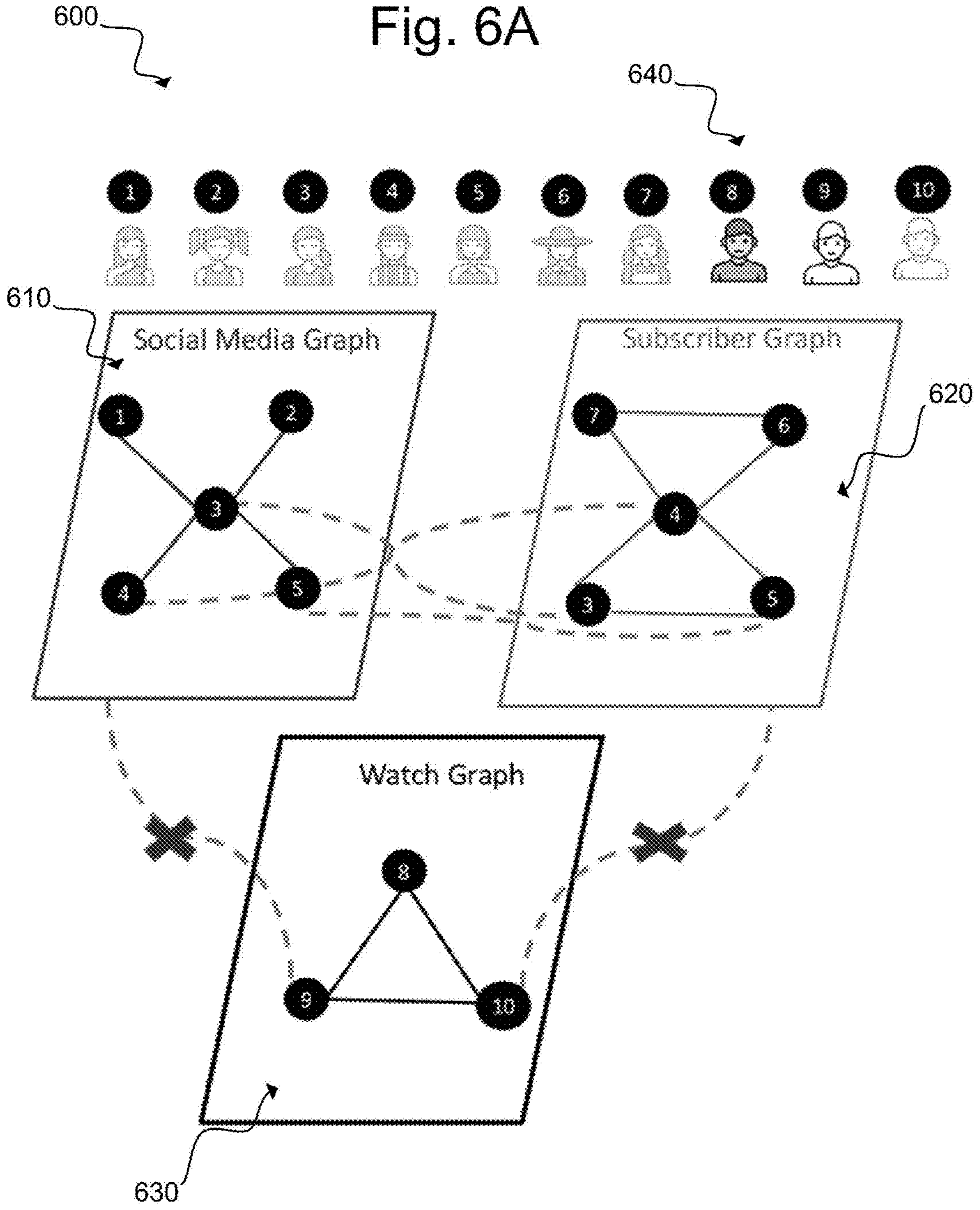
FIG. 6A shows an exemplary heterogeneous graph which may be used with the techniques described herein to provide a media recommendation in accordance with some examples of the disclosure.

In online and/or offline applications, which may include social media and digital multimedia platforms, users, items and their interactions can be stated as heterogeneous graphs 600, as shown in FIG. 6A. These heterogeneous graphs 600 may include multiple graphs (domains), such as Social Media Graph 610, Subscriber Graph 620, and Watch Graph 630 of FIG. 6A. In these multi domains, some of the nodes, which may be users and/or items may or may not be common. Users 640 are also shown in FIG. 6*a*. In an example, users 3, 4, and 5 of the users 640 are common between Social Media and Subscribe Graphs in FIG. 6A, while there are no common nodes among Watch, and Social and Subscribe Graphs.

To enable user behavior prediction and item recommendation, such heterogeneous graphs are not optimal because they are too sparse to use in Machine Learning ('ML') models. Thus, it is proposed to use a more compact representation of heterogeneous graphs to train (or use as an input to) ML models. This compact representation is coined as "graph representation, network embedding, node embedding". This network embedding in mathematical forms will now be described.

For example, in FIG. 6A there are 10 distinct and 3 common users, and it is proposed to map these heterogeneous graphs 600 into a compact matrix, $H \in R^{13 \times d}$ such that the compact matrix may be used in ML models, where d is a parameter that determines compactness, the size of learnt compact representation matrix, such as 3, which is smaller than 13 in the example of FIG. 6A.

In an example, let $\mathcal{G}=(\nu, \varepsilon)$ be a K partial multi-view graph, where V be unified node and & be unified edge sets, such that $$\nu = \bigcup_{i=1}^{K} \nu_i,\ \varepsilon = \bigcup_{i=1}^{K} \varepsilon_i, \text{ and } \mathcal{G} = \bigcup_{i=1}^{K} (\nu_i, \varepsilon_i)$$

Because of the partial multi-view definition, let $|\nu_i|=n_i \neq n_j=|\nu_j|$, $\forall i \neq j$, however there could be $C_{ij}$ overlapping common nodes in each views and let total number of nodes denotes $n=|\nu|$. Further, there are attributes, $F_i$, associated to each node in each domain by size $d_i \forall i \in \{1, 2, \ldots, K\}$ and in general $d_i \neq d_j$, $\forall i \neq j$. One example purpose of Heterogeneous Attributed Network Embedding is to map $\mathcal{G}$ to a latent embedding space $H \in \mathbb{R}^{n \times d}$, where $d << d_i$, such that the importance of domains, the importance of a common node across domains, and the importance of groups of nodes across domains may be established.

An example objective function of the proposed method may be two-fold: within and across domain consistency. Within domain consistency, in a specific domain, if two nodes are close by sharing many commonalities, then in the learnt compact matrix representation, their corresponding vectors, row vectors corresponding to the nodes, must be close. For example, in a "Watch" domain, if two users are watching the same/similar types of videos, this similarity may be encoded in the learnt compact matrix representation. Across domain consistency, similar domains' nodes should be close to each other in the learnt compact representation matrix. For example, given three domains, "Watch", "Subscribe", and "Like". If "Watch" and "Subscribe" are more similar to each other than that of "Like", rows of learnt compact representation matrix corresponding to nodes in reside in "Watch", "Subscribe" should be closer to each other than that of the rows corresponding to nodes in "Like" nodes. This domain similarity of importance is mathematically formulated below. Consequently, in the literature, transition from one partial domain to another is achieved by passing through the common nodes, by using common nodes as indicators.

Figure 6B:
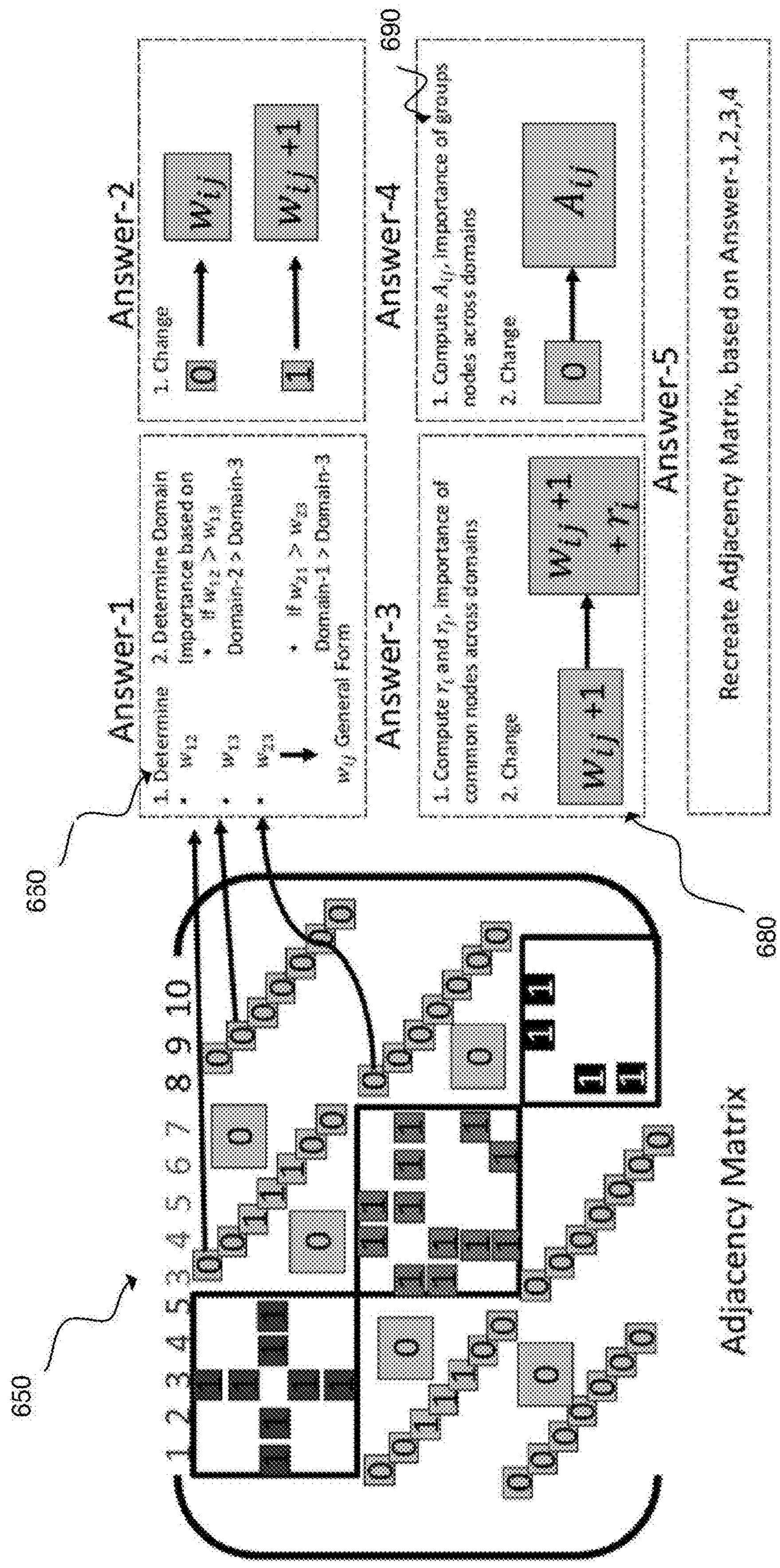
FIG. 6B shows an exemplary adjacency matrix which may be used with the techniques described herein to provide a media recommendation in accordance with some examples of the disclosure.

In an example, in FIG. 6A, common users 640 between the "Social Media" 610 and "Subscriber" 620 domains, users 640 denoted 3, 4, and 5 fulfill the domain transition via putting 1 s in adjacency matrix 650 in FIG. 6B. However, if there are no common nodes between two domains, then transition between domains cannot be performed. In the subsequent paragraphs, an explanation of how the present disclosure remedies across domain consistency from the perspective of importance of domains is set out.

The proposed methodology with two main objectives will now be set out. The first objective is automatically determining which domain is more important than the others. The second objective is providing techniques for learning algorithms for transition from one domain to another, while learning compact matrix form of heterogeneous graph, if there are some or no common entities between two domains.

In one example, in FIG. 6A, the Subscriber Graph 620 includes structural patterns of the Social Media Graph 610 and the Watch Graph 630. Thus, at a glance, the Subscriber Graph 620 may be considered as being more important than other two, however, it must be considered how to force the compact representation learning to use this information.

In another example, in FIG. 6A, the Watch Graph 630 has no common nodes with other two domains. Thus, based upon current understanding of compact representation learning, the existing algorithms may not provide a transition from one domain to another in such occasions and the edges from the Watch Graph 630 to others are ignored, represented as crossed edges in FIG. 6A. However, in terms of triangle pattern sharing, the Watch Graph 630 is more similar to the Subscriber Graph 620 than that of the Social Media Graph 610. The following description sets out a mathematical methodology to integrate this similarity into graph representation learning framework.

In this example, let $A_i$ be adjacency matrix representation of the i-th domain. Then, the adjacency matrix of $\mathcal{G}$ may be defined as follows:

$$A = \begin{bmatrix} [A_1] & I & I \\ I & \ddots & I \\ I & I & [A_K] \end{bmatrix}$$

In this example, I is an identity matrix and its diagonal entries contains 1 s for common nodes; 0 s otherwise. Previous efforts have focused on partial multi-view embedding by using the above adjacency representation within deep or linear embedding framework.

However, in the present disclosure, partial I matrices are merely indicators and do not reveal the importance of domains. In one example, the present disclosure proposes to utilize Wasserstein Discrepancy between degree distributions of domains, which may be described as a histogram which shows the count of number of nodes connected to each nodes, to determine importance of domains. More specifically, in one example, the present disclosure assesses the similarity of pairs of domains utilizing p-Wasserstein.

Let μ and ν denote the measures on spaces X and y, respectively, in which we can state length, height, etc., for layers $\mathcal{G}_i$'s and $\mathcal{G}_j$'s degree distributions, which can be obtained from $A_i$ and $A_j$. In general, the p-Wasserstein of μ and ν is defined by the following equation:

$$d_{w_p}(\mu, \nu) = \min_{\pi \in \Pi(\mu,\nu)} \left( \int_{\mathcal{X} \times \mathcal{Y}} |x-y|^p d\pi(x, y) \right)^{\frac{1}{p}} \quad \text{(Equation 1)}$$

Here, Π is a set of measures whose margins on $\mathcal{X}$ and $\mathcal{Y}$ are μ and σ, respectively, and $\mathcal{X}$ and $\mathcal{Y}$ are one unit of masses. In essence, p-Wasserstein aims at finding an optimum plan to convert one pile of masses to another.

The present disclosure argues that similarity of domains can be measured by their degree distributions by using 1-Wasserstein similarities. That is, histograms which are generated by degree distributions of the domains may be treated as 1-dimensional shapes on real lines and their similarity can be computed via a 1-Wasserstein metric with cumulative distribution functions. More specifically, given two-degree distributions, histograms, and their measures μ and ν, non-decreasing cumulative distribution functions, F and G are given as:

$$F(x) = \int_{-\infty}^{x} d\mu = \mu((-\infty, x)) \quad \text{(Equation 2)}$$

Thus, the generalized inverse of F may be given by:

$$F^{-1}(t) = inf\{x \in \mathbb{R}: x > t\} \quad \text{(Equation 3)}$$

The $\mathcal{G}$ function may also be defined the same as the F function with mass y and measure ν. Importantly, a solution to Equation 2 may be given as:

$$d_{w_p}(\mu, \nu) = \int_{\mathbb{R}\times\mathbb{R}} |F(x) - G(y)|\, d\pi \quad \text{(Equation 4)}$$

After computing the 1-Wasserstein distance between degree distributions $\mathcal{G}_i$ and $\mathcal{G}_j$, the structural similarities between two domains may be computed by the following equation, in which σ is a tuning parameter:

$$w_{ij} = \exp\left(\frac{-d_{w_1}(\mu_{\mu,\nu})}{\sigma}\right) \quad \text{(Equation 5)}$$

The adjacency matrix A of $\mathcal{G}$ may be stated as:

$$A = \begin{bmatrix} [A_1] & w_{12}I & \dots & w_{1K} \\ \vdots & \ddots & \dots & \dots \\ w_{K1}I & \dots & \dots & [A_K] \end{bmatrix}$$

It should be highlighted that the row sum of this Kernel Matrix is used to automatically determine which domain is more important than the others. For example, in FIG. 6B, the Kernel Matrix weights, $w_{12}$, $w_{13}$, and $w_{23}$ may be computed and used to determine which domain is more important. To achieve this, we can compare these weights one-by-one, e.g, if $w_{12} > w_{13}$, it may be concluded that the Subscribe Domain 620 is more important than the Watch Domain 630 from the perspective of the Social Domain 610 in, see Answer-1 660 of FIG. 6B. Moreover, these weights may be used to fulfill transportation from one domain to another even if these two domains do not share any common nodes.

In FIG. 6A the Watch Domain 630 does not share any common nodes with the Social 610 and Subscribe 620 domains, but $w_{12}$ and $w_{13}$ may be used to weight these transitions, while learning the compact representation matrix. This corresponds with see Answer-1 660 of FIG. 6B. This transportation may be useful in structural similarities of two domains, while learning the compact representation matrix.

In one example, the kernel weights, $w_{ij}$, may be computed by Gromov-Wassertein to compute structural partial multi-views' similarities. In another example, node attributes and labels may be used to and compute the $w_{ij}$s by using Fused-Gromov Wasserstein Discrepancy. It is important to note that the present disclosure is not limited to the exemplary embodiments and use-cases described in this disclosure, but may be applied to the widest scope. The proposed methods and systems can also operate effectively in other implementations.

While learning graph representations of multi domains, the existing algorithms may ignore the importance of a common node across domains and treat their contributions to learning process equally. However, each common node in different domains may play a different role. In an example, in FIG. 6A the user 660 denoted 3 in the Social Media Graph 610 may play an active role by connecting four distinct entities, while the user 660 denoted 3 in the Subscribe Graph 620 may play a less active role by connecting two distinct entities.

The importance of domains and determining how to teleport from one domain to another while learning compact representation matrix will now be discussed. It is also useful to know importance of common nodes across domains. For example, as shown in FIG. 6A, the user 640 denoted 3 may play a central role in the Social Media Domain 610, while it is not a central node in the Subscribe Domain 620. Thus, the importance of a common node across domains should be distinguished. To achieve this, the present disclosure proposes the following methodologies. For given $A_i$ and $A_J$ adjacency matrices of views i and j, firstly it is proposed to perform random walk with restarts (RWR) by using common nodes as seeds. Formally, let $e_i$ and $e_j$ be one-hat vectors for common nodes between i-th and j-th partial views.

In one example the following linear systems of equations with respect to es $$r_j = (1-\alpha)\left(I - \alpha D_i^{-1} A_i\right)^{-1} e_i \quad \text{(Equation 6)}$$

and $$r_j = (1-\alpha)\left(I - \alpha D_j^{-1} A_j\right)^{-1} e_j \quad \text{(Equation 7)}$$

where $D_i$ and $D_j$ are degree matrices of i-th and j-th view respectively and $\alpha \in (0,1)$ may be solved.

In an example, the importance of common nodes across domains may be determined by averaging these RWR vectors for only common nodes, i.e., $s_{ij} = r_i + r_j$, to score the importance of common nodes, note $s_{ij}$ is a vector. Also, this is not limited to averaging, it may be used to derive various scoring mechanisms, such as harmonic means. In another example, determining the importance of nodes across domains is not limited to RWR, and may be computed using various closeness measures, such as Common Neighbor, Adamic Adar, Jacard Index, and the like.

After computing importance of common nodes across domains, the present disclosure may modify the adjacency matrix of $\mathcal{G}$ by shifting diagonals with positive weight accordingly. For instance, in Answer-3 680 shown in FIG. 6B, first, the importance of common nodes across domains as $r_i$ and $r_j$ for domains i and j may be computed. It should be noted that that the larger $r_i(i)$ may mean a greater importance of i-th node in domain i, with reference to FIG. 6B.

$$A = \begin{bmatrix} [A_1] & w_{12}I + s_{12} & \dots & w_{1K}I + s_{1K} \\ \vdots & \ddots & \dots & \dots \\ w_{K1}I + s_{K1} & \dots & \dots & [A_k] \end{bmatrix}$$

It will now be discussed how determining importance of groups of nodes across domains may be integrated into graph representation learning framework, i.e., learning a compact matrix form of heterogeneous graphs. For instance, the common users 660 denoted 3, 4, and 5 in FIG. 6A exhibit different connections in different domains. By individually looking at Social Media Graph 610 and Subscribe Graph 620 via the connections across the graph, the existing techniques may not determine proximity or closeness between users 660 denoted 3 and 7 in the example.

However, through the indirect paths, these two nodes are related. To capture these types of indirect relationships, the importance of groups of nodes across domains into compact representation learning of heterogeneous graphs may be mathematically formulated. Formally, although the adjacency matrix described above encodes the importance of common nodes across domains, it does not provide information about the importance of groups of nodes across domains. The present disclosure integrates this importance of groups of nodes across domains into graph learning framework by measuring the cross domain closeness. More specifically, the adjacency matrix is rewritten as follows:

$$L = \beta \cdot \begin{bmatrix} [A_1] & w_{12}I + s_{12} & \dots & w_{1K}I + s_{1K} \\ \vdots & \ddots & \dots & \dots \\ w_{K1}I + s_{K1} & \dots & \dots & [A_K] \end{bmatrix} + (1-\beta)\begin{bmatrix} 0 & A_{12} & \dots & A_{1K} \\ A_{21} & 0 & A_{23} & \dots \\ \vdots & & \ddots & \dots \\ A_{K1} & A_{K2} & \dots & 0 \end{bmatrix} \quad \text{(Equation 8)}$$

where $\beta \in [0,1]$.

In one example, $A_{ij}$ can be cosine angles among the columns of transition matrices of i-th and j-th domains. That is, $$A_{ij} = P_i^T \odot P_j, \text{ where } P_i = D_i^{-1} \odot A_i$$

and $\odot$ is dot product. This way, it is possible to capture indirect relations among group of nodes across domains by computing $A_{ij}$ instead of treating them as zero blocks 695 in FIG. 6B, with reference to Answer-4 690.

In another example, this importance of groups of nodes across domains may be computed via various measures, such as Pearson correlation, KL-Diverge or any other appropriate means. It is important to note that the present disclosure is not limited to the exemplary embodiments and use-cases described in this disclosure, but may be applied to a wide scope. The proposed methods and systems may also operate effectively in other implementations.

In this example, by defining the general form of heterogeneous graph, as discussed in the examples above, it may be shown mathematically that graph representation learning may be carried out by using Deep Learning-Based and Linear Learning-Based approaches.

After constructing the above L matrix shown in Equation 8, which encodes additional information: importance of domains, importance of a common node across domains, and importance of groups of nodes across domains, we can now perform deep or linear heterogeneous network embedding, $H \in \mathbb{R}^{d \times n}$. To achieve this, the side information-attribute-matrix in block diagonal F may first be defined. Subsequently, the present disclosure creates $\tilde{L}=L+I$ and $\tilde{D}=D+I$, where D degree matrix of L. Note that $\tilde{L}$ is the general matrix which was formed throughout the examples described above. This general matrix encodes domain importance, importance of nodes across nodes, and importance of groups of nodes across domains as well as renders domain to domain transition even if there are no common nodes.

In an example, a matrix for a Graph Convolution Networks ('GCN') encoder may be created:

$$\hat{L} = \tilde{D}^{-\frac{1}{2}} \tilde{L} \tilde{D}^{-\frac{1}{2}} \quad \text{(Equation 9)}$$

Using the above $\hat{L}$ matrix, the representation of the heterogeneous graph may be obtained by:

$$H = ReLU\left(\hat{L}\left(ReLU\left(\hat{L}F\Theta^{(0)}\right)\right)\Theta^{(1)}\right) \quad \text{(Equation 10)}$$

In Equation 10, the ReLU Rectified Linear Unit function and $\Theta^{(0)}$ and $\Theta^{(1)}$ are neural network weights which may be learned by minimizing the following loss function:

$$\mathcal{L} = \underset{\Theta^{(0)},\Theta^{(1)}}{\text{minimize}} \left\| L - SIGMOID\left(H \times H^T\right) \right\| \quad \text{(Equation 11)}$$

In some other examples, the objective function may be made more sophisticated by Deep Graph Infomax and embedding is attained accordingly. In another example, the multi-hub relation of the $\hat{L}$ matrix may be used and SiGRaC algorithm may be used to obtain the embedding.

In further examples, the present disclosure also proposes to develop attributed linear embedding by using the $\hat{L}$ matrix in the following way. In one example, joint optimization by alternating algorithms is proposed. More specifically, it is proposed to jointly optimize the following equations:

$$\underset{U_{\mathcal{G}}}{\text{maximise}}\ \mathcal{J}_{\mathcal{G}} = \text{trace}\left(U_{\mathcal{G}}^T L_{\mathcal{G}} U_{\mathcal{G}}\right) \quad \text{(Equation 12)}$$
$$\text{subject to } \left(U_{\mathcal{G}}^T U_{\mathcal{G}} = I\right)$$

The solution to these equations may be attained as eigenvectors corresponding to the top d eigenvalues. To facilitate the attribute information, F, as an additional information in the learning framework, with the same logic as discussed above, the same trace optimization may be generated for the attributes, such that:

$$\underset{U}{\text{maximise}}\ \mathcal{J}_F = \text{trace}\left(U^T L_F U\right) \quad \text{(Equation 13)}$$
$$\text{subject to } \left(U^T U = I\right)$$

where $L_F$ is obtained from an affinity matrix of attributes. Then, for attributed network embedding, these two objectives, $\mathcal{J}_{\mathcal{G}}$ and $\mathcal{J}_F$ may be jointly optimized.

In summary, the present disclosure considers the importance of domains, importance of common nodes across domains, and importance of groups of nodes across to domains and integrates such items of information into a graph representation learning framework. In particular, a compact representation matrix may be designed to decide which domain is more informative than others and how transition from one domain to another should be carried out, when there is no one-to-one correspondence among the domains (incomplete data). Then, this integrated information matrix, an association matrix among the nodes of an incomplete multi-domain graph, may be ready to use for Non-linear, e.g., deep learning, and Linear Attributed Embedding approaches. Overall, the present disclosure proposes a unified framework for multi-domain incomplete heterogeneous networks and aligns the multi-domains accordingly and can be utilized in real-world machine learning applications, including consumer behavior prediction, and targeted advertising, multimedia content recommendation, ranking the most relevant multimedia content for a given user (or a group of users), etc.

As described above, the techniques described herein may be used to capture how group-wise similar users are, and such group-wise similarity may be employed in watch party content. In an example, three separate watch party groups, group A, group B, and group C are considered. If group A and group B are more similar to each other than group C, the movies that are watched by group A can be recommended to group B, not group C.

Figure 7:
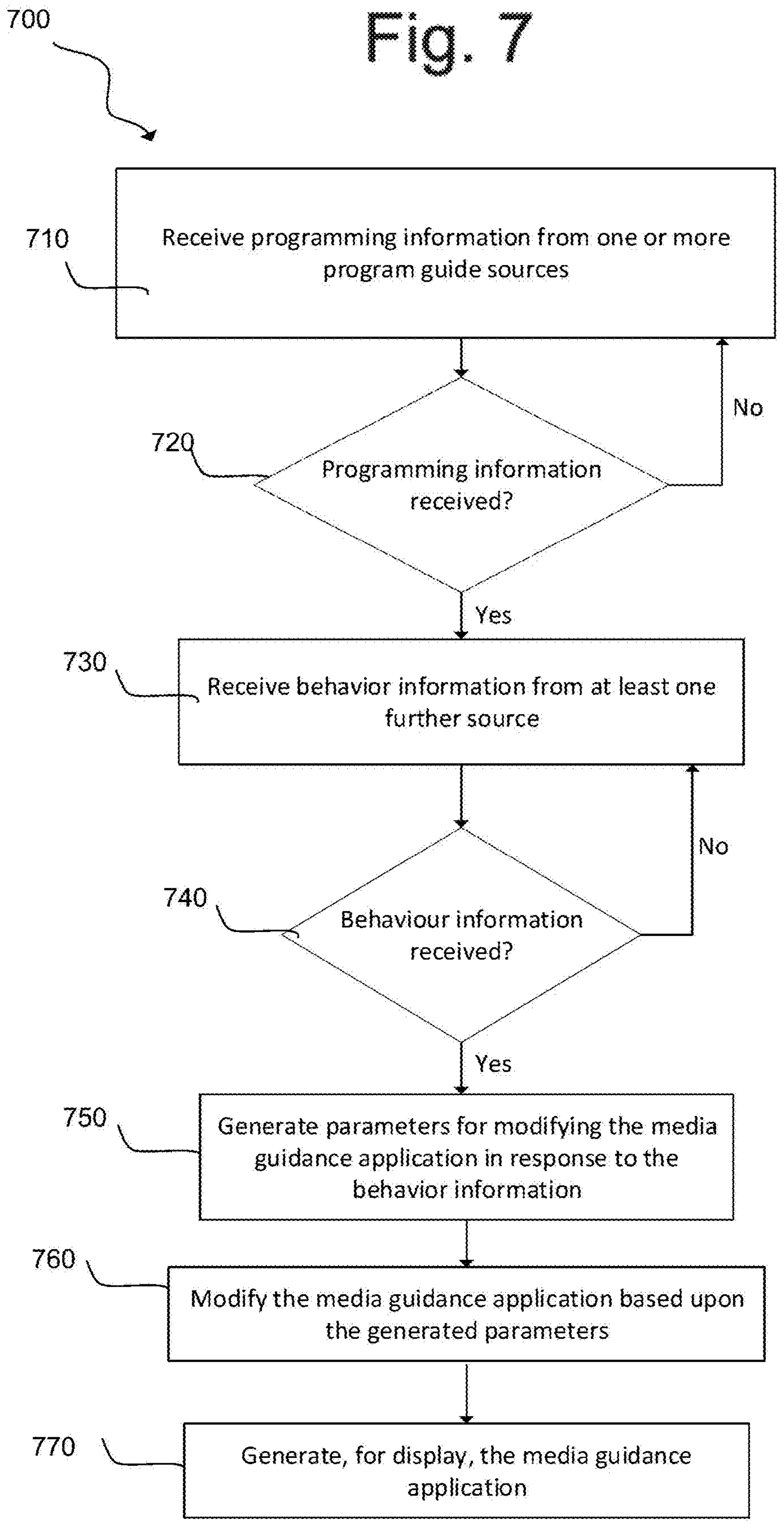
FIG. 7 is a flowchart representing a process for modifying a media guidance application in accordance with some examples of the disclosure.

FIG. 7 is a flowchart representing an illustrative process 700 for modifying a media guidance application in accordance with some aspects of the disclosure. Whilst the example shown in FIG. 7 refers to the use of system 100, as shown in FIG. 1, it will be appreciated that the illustrative process shown in FIG. 7 and any of the other illustrative processes, may be implemented on system 100, system 200, system 300, either alone or in any combination, and/or on any other appropriately configured system architecture.

At step 710, programming information is received from one or more program guide sources. This programming information, as described above, may be received via network 104 from servers 106 and/or content database 108. The programming information may be in the form of data for a media guidance application.

At step 720, a determination may be made as to whether the programming information has been received. If programming information has not been received, the process may return to the previous step, step 710. If programming information has been received, the process may advance. A check to establish whether the programming information is valid may also be carried out.

At step 730, behavior information may be received from at least one further source. This information may be the viewing behavior and/or information about media which a user 110 has consumed on another service, which may be an over-the-top streaming service. The behavior information may be in the form of metadata, viewing data, viewing location, and/or any other suitable data which may provide information about the viewing habits of the user 110. In addition, the viewing progress of the user 110 may be tracked. In an example if the user 110 is watching a program on an over-the-top streaming service, the behavior information may include the season number and episode number at which the user 110 has reached.

At step 740, a determination may be made as to whether the behavior information has been received. If behavior information has not been received, the process may return to the previous step, step 730. If behavior information has been received, the process may advance. A check to establish whether the behavior information is valid may also be carried out.

At step 750, parameters for modifying the media guidance are generated in response to the behavior information. These parameters may be generated using the data processing techniques described herein, with particular reference to FIGS. 6A and 6B and the accompanying description. The parameters, in the current example, describe trends, recommendations, or trends regarding the media consumption habits of the user 110. In an example, if the behavior information indicates that the user 110 has consumed a program on an over-the-top streaming service, and episodes beyond those which the user 110 has consumed are not available on the over-the-top streaming service but are available on the service to which the electronic program guide relates, the media guidance application may be modified to highlight episodes of the program which are available in the electronic program guide but not on their chosen over-the-top streaming service.

In another example, the parameters which are generated may be key value pairs which may be 'Genre: Comedy; Actors {Samuel L Jackson, Brad Pitt, Salma Hayek}'. These key pairs may be used to identify the programs in the media guidance application which are to be highlighted. In a further example, the parameters which are generated may be the titles of programs or series, or may be based upon the time at which a user 110 has viewed a particular channel or show. The parameters which are generated may also be a combination of the examples described above.

At step 760, the media guidance application is modified based upon the parameters. The media guidance application may be modified in a like fashion to that described in connection with FIG. 1.

At step 770, the media guidance application is generated for display. The media guidance application may be displayed on user equipment 102.

The actions or descriptions of FIG. 7 may be used with any other example of this disclosure. In addition, the actions and descriptions described in relation to FIG. 7 may be done in any suitable alternative orders or in parallel to further the purposes of this disclosure.

Figure 8:
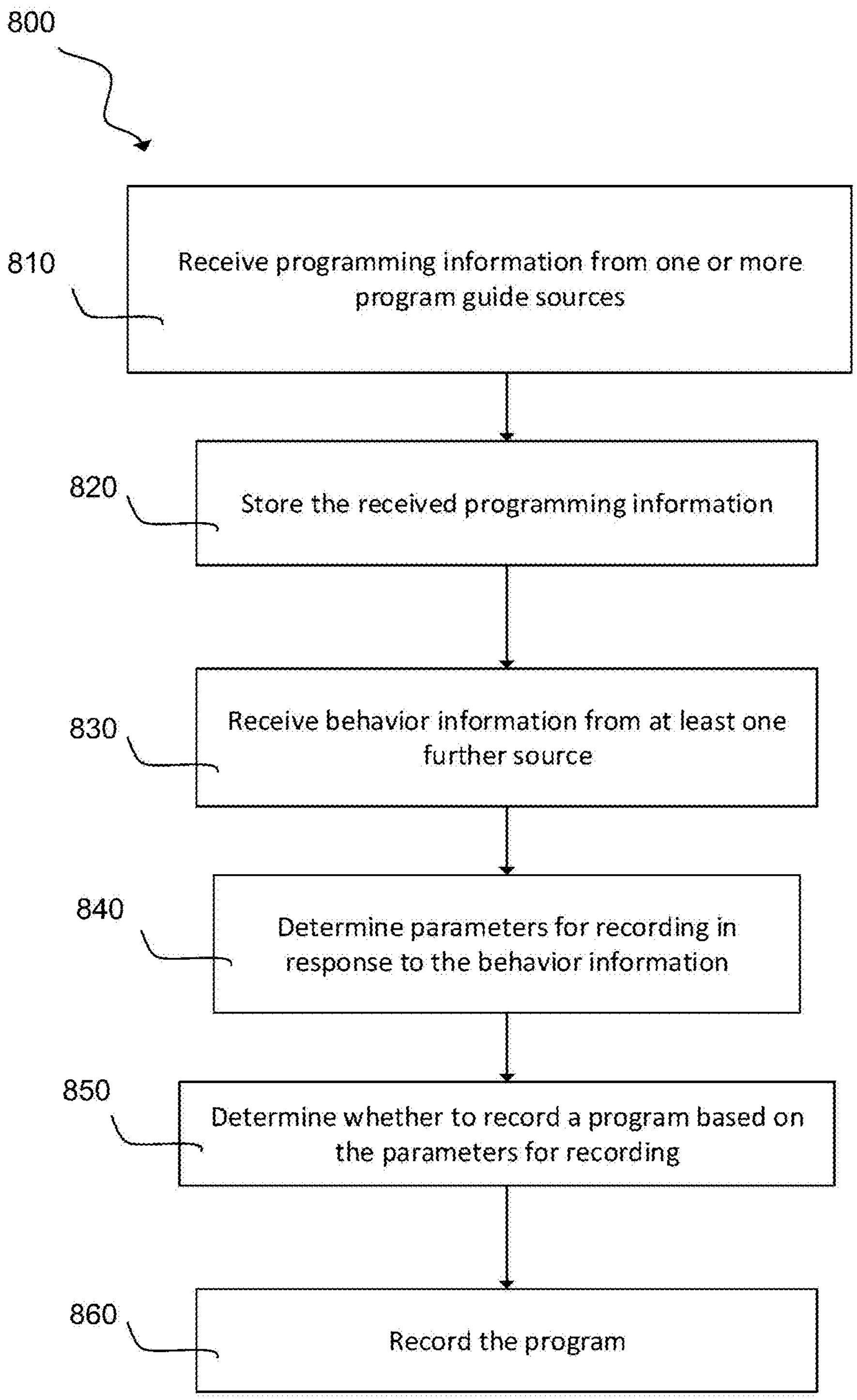
FIG. 8 is a flowchart representing a process for determining whether to record a program in accordance with some examples of the disclosure.

FIG. 8 is a flowchart representing an illustrative process 800 for determining whether to record a program or item of media content in accordance with some aspects of the disclosure. Whilst the example shown in FIG. 8 refers to the use of system 100, as shown in FIG. 1, it will be appreciated that the illustrative process shown in FIG. 8 and any of the other illustrative processes, may be implemented on system 100, system 200, system 300, either alone or in any combination, and/or on any other appropriately configured system architecture.

At step 810, as with step 710 of the process described in FIG. 7, programming information is received from one or more program guide sources. This programming information, as described above, may be received via network 104 from servers 106 and/or content database 108. The programming information may be in the form of data for a media guidance application.

At step 820, the received programming information is stored. Such programming information may be stored in non-volatile memory which forms part of user equipment 102. The non-volatile memory may be storage on which programs or media may be stored, or may be an alternative storage location. In some examples, the programming information may be stored in a cloud or remote location.

At step 830, as with step 730 of the process described in FIG. 7, behavior information may be received from at least one further source. This information may be the viewing behavior and/or information about media which a user 110 has consumed on another service, which may be an over-the-top streaming service. The behavior information may be in the form of metadata, viewing data, viewing location, and/or any other suitable data which may provide information about the viewing habits of the user 110.

At step 840, in a similar way to step 840 of the process described in FIG. 7, parameters are determined. These parameters may be generated using the data processing techniques described herein, with particular reference to FIGS. 6A and 6B and the accompanying description The parameters, in the current example, describe trends, recommendations, or trends regarding the media consumption habits of the user 110.

At step 850, a determination is made as to whether to record a program or item of media content in dependence upon the parameters.

At step 860, the program or item of media content is recorded. The media content may be recorded on storage which forms part of the user equipment 102, which is connected to the user equipment 102, and/or may be remote from, or connected to via network 104 to the user equipment 102. The program or item of media content may be recorded to a cloud location.

The actions or descriptions of FIG. 8 may be used with any other example of this disclosure. In addition, the actions and descriptions described in relation to FIG. 8 may be done in any suitable alternative orders or in parallel to further the purposes of this disclosure.

Figure 9:
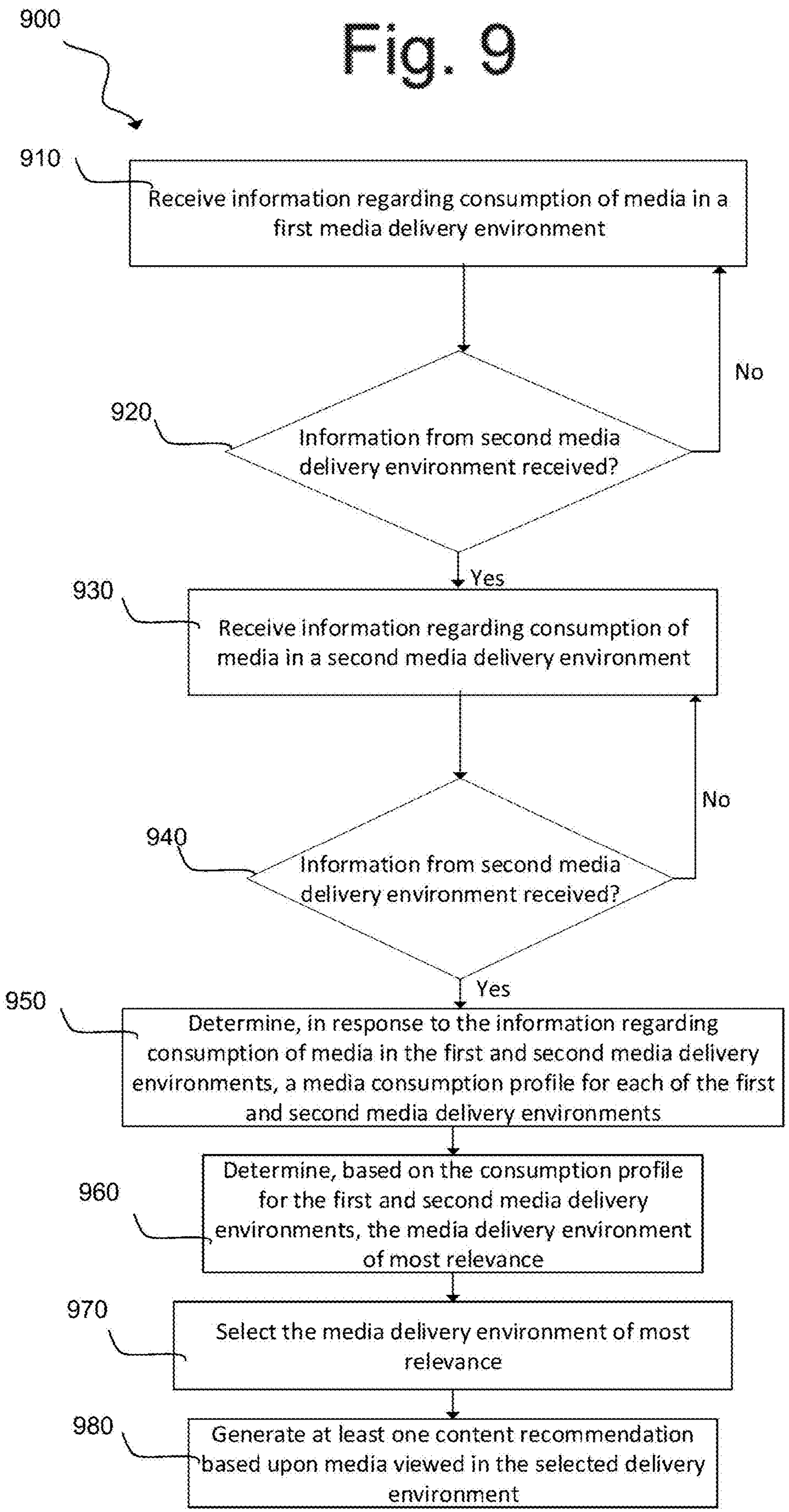
FIG. 9 is a flowchart representing a process for providing a media recommendation in accordance with some examples of the disclosure.

FIG. 9 is a flowchart representing an illustrative process 900 for modifying a media guidance application in accordance with some aspects of the disclosure. Whilst the example shown in FIG. 9 refers to the use of system 100, as shown in FIG. 1, it will be appreciated that the illustrative process shown in FIG. 9 and any of the other illustrative processes, may be implemented on system 100, system 200, system 300, either alone or in any combination, and/or on any other appropriately configured system architecture.

At step 910, information is received regarding consumption of media by a user 110 in a first media delivery environment. This media delivery environment may be an over-the-top streaming service, online video sharing platform, audio delivery platform, or similar.

At step 920, a determination may be made as to whether the information regarding consumption of media by a user 110 in a first media delivery environment has been received. If this information has not been received, the process may return to the previous step, step 910. If the information has been received, the process may advance. A check to establish whether the information is valid may also be carried out.

At step 930, information is received regarding consumption of media by a user 110 in a second media delivery environment. This media delivery environment is a different media delivery environment, and may be a different over-the-top streaming service, online video sharing platform, audio delivery platform, or similar.

At step 940, a determination may be made as to whether the information regarding consumption of media by a user 110 in a second media delivery environment has been received. If this information has not been received, the process may return to the previous step, step 910. If the information has been received, the process may advance. A check to establish whether the information is valid may also be carried out.

At step 950, in response to the information received regarding media consumption in the first and second media delivery environments, a media consumption profile is determined for each of the first and second media delivery environments.

At step 960, based upon the consumption profile for the first and second media delivery environments, the media delivery environment of most relevance is determined.

At step 970, based upon the consumption profiles determined, the media delivery environment of most relevance is selected.

At step 980, at least one content recommendation is generated based upon the viewing history of the user 110 in the selected media delivery environment.

The actions or descriptions of FIG. 9 may be used with any other example of this disclosure. In addition, the actions and descriptions described in relation to FIG. 9 may be done in any suitable alternative orders or in parallel to further the purposes of this disclosure.

Figure 10:
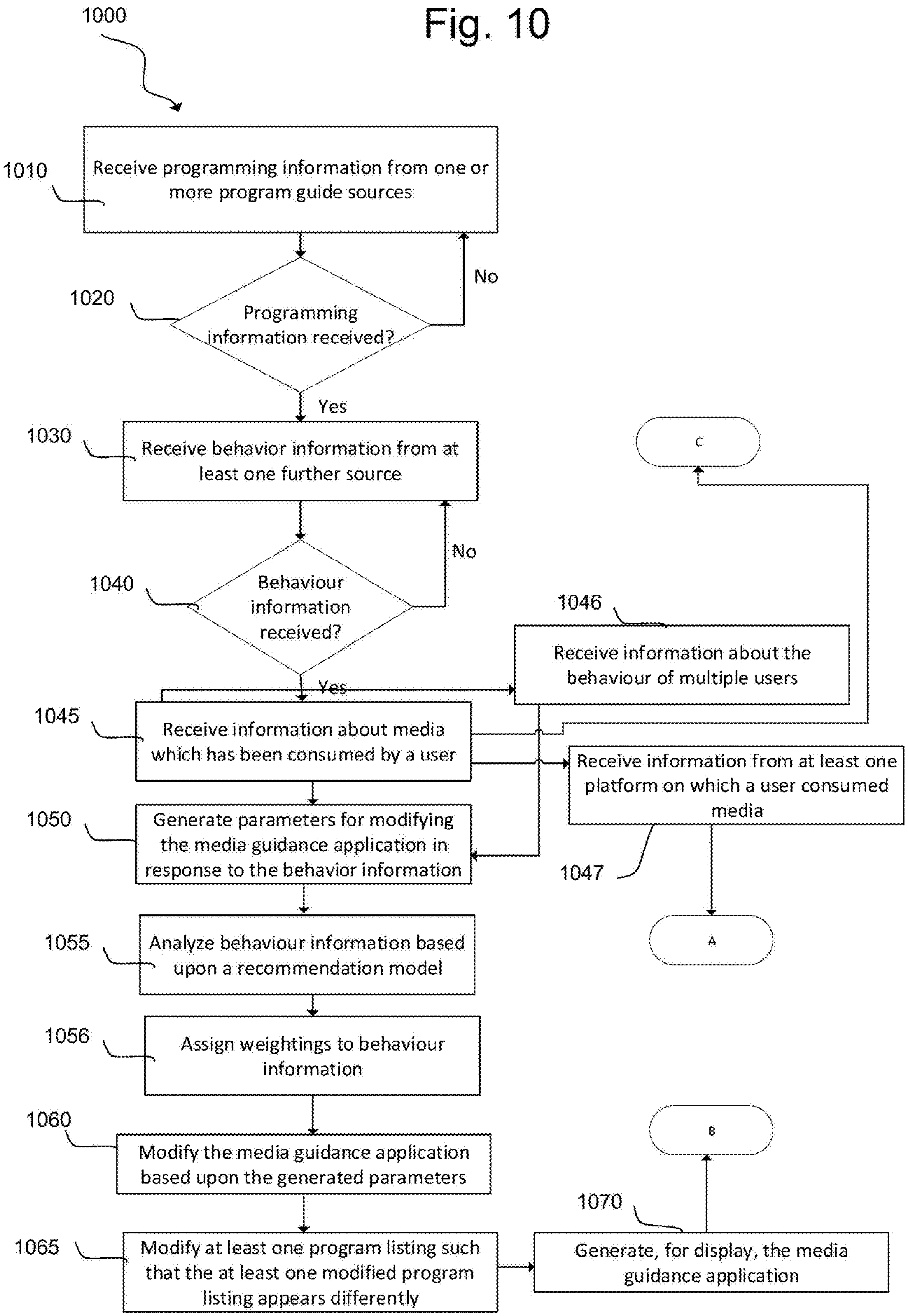
FIG. 10 is a flowchart representing a process for modifying a media guidance application in accordance with some examples of the disclosure.

FIG. 10 is a flowchart representing an illustrative process 1000 for modifying a media guidance application in accordance with some aspects of the disclosure. Whilst the example shown in FIG. 10 refers to the use of system 100, as shown in FIG. 1, it will be appreciated that the illustrative process shown in FIG. 10 and any of the other illustrative processes, may be implemented on system 100, system 200, system 300, either alone or in any combination, and/or on any other appropriately configured system architecture. Further, is it to be understood that the steps outlined in FIG. 10 may be incorporated, where technically possible, with the steps outlined in process 700 shown in FIG. 7 and/or process 900 shown in FIG. 9.

At step 1010, programming information is received from one or more program guide sources. This programming information, as described above, may be received via network 104 from servers 106 and/or content database 108. The programming information may be in the form of data for a media guidance application.

At step 1020, a determination may be made as to whether the programming information has been received. If programming information has not been received, the process may return to the previous step, step 1010. If programming information has been received, the process may advance. A check to establish whether the programming information is valid may also be carried out.

At step 1030, behavior information may be received from at least one further source. This information may be the viewing behavior and/or information about media which a user 110 has consumed on another service, which may be an over-the-top streaming service. The behavior information may be in the form of metadata, viewing data, viewing location, and/or any other suitable data which may provide information about the viewing habits of the user 110.

At step 1040, a determination may be made as to whether the behavior information has been received. If behavior information has not been received, the process may return to the previous step, step 1030. If behavior information has been received, the process may advance. A check to establish whether the behavior information is valid may also be carried out.

At step 1045, information may be received about media which has been consumed by a user 110. After this step, the process may advance to part ‘C’ shown in FIG. 13.

At step 1046, information may be received about the behavior of multiple users, for analysis using the techniques described herein. This information may be passed to step 1050 as part of the behavior information.

At step 1047, information about at least one platform on which a user 110 consumed media may be received. After this step, the process may advance to part 'A' shown in FIG. 11.

At step 1050, parameters for modifying the media guidance are generated in response to the behavior information. These parameters may be generated using the data processing techniques described herein, with particular reference to FIGS. 6A and 6B and the accompanying description. The parameters, in the current example, describe trends, recommendations, or trends regarding the media consumption habits of the user 110.

At step 1055, the behavior information may be analyzed based upon a recommendation model, with the recommendation model generated using the data processing techniques described herein, with particular reference to FIGS. 6A and 6B and the accompanying description.

At step 1056, weightings may be assigned to the behavior information again using the data processing techniques described herein, with particular reference to FIGS. 6A and 6B and the accompanying description.

At step 1060, the media guidance application is modified based upon the parameters. The media guidance application may be modified in a like fashion to that described in connection with FIG. 1.

At step 1065, at least one program listing may be modified such that the modified program listing appears differently in the media guidance application.

Figure 12:
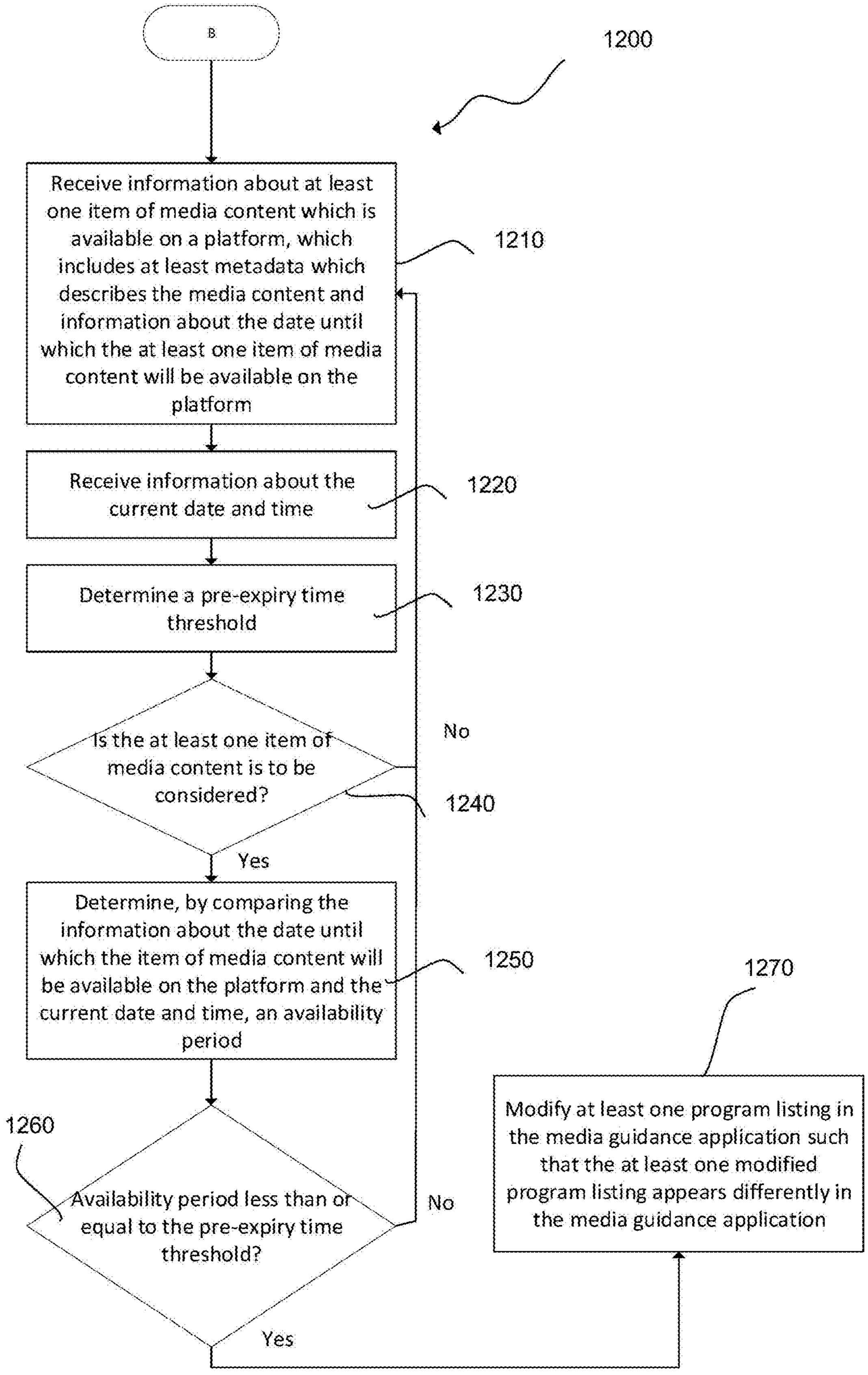
FIG. 12 is a flowchart representing a process for modifying a media guidance application in determination upon the expiry date of a media item in accordance with some examples of the disclosure.

At step 1070, the media guidance application is generated for display. The media guidance application may be displayed on user equipment 102. The process may then advance to part 'B' as shown in FIG. 12.

The actions or descriptions of FIG. 10 may be used with any other example of this disclosure. In addition, the actions and descriptions described in relation to FIG. 10 may be done in any suitable alternative orders or in parallel to further the purposes of this disclosure.

Figure 11:
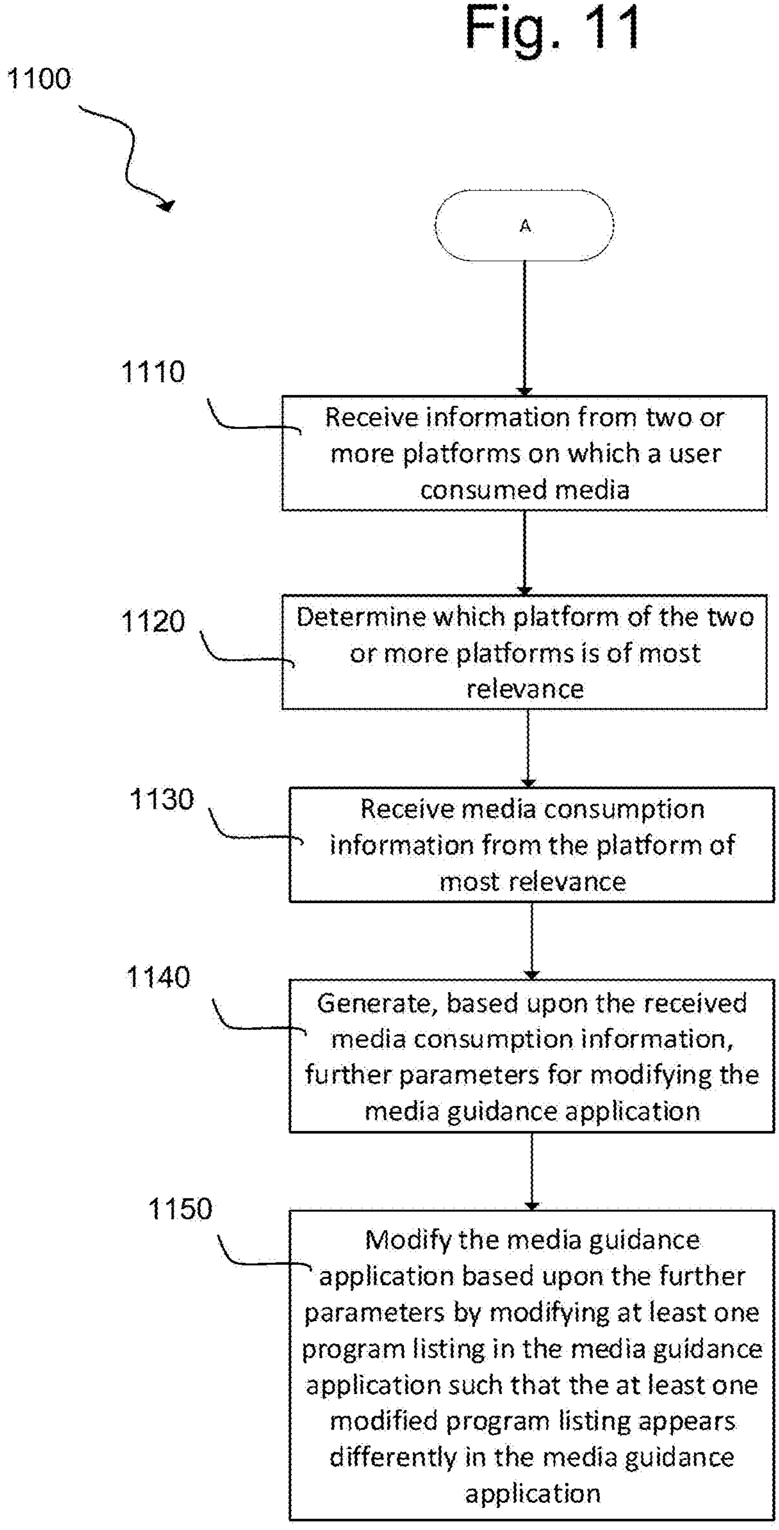
FIG. 11 is a flowchart representing a further process for modifying a media guidance application in accordance with some examples of the disclosure.

FIG. 11 is a flowchart representing an illustrative process 1100 for modifying a media guidance application in accordance with some aspects of the disclosure. Process 1100 starts at step 'A' which may correspond to that shown in FIG. 10. Whilst the example shown in FIG. 11 refers to the use of system 100, as shown in FIG. 1, it will be appreciated that the illustrative process shown in FIG. 11 and any of the other illustrative processes, may be implemented on system 100, system 200, system 300, either alone or in any combination, and/or on any other appropriately configured system architecture. Further, is it to be understood that the steps outlined in FIG. 11 may be incorporated, where technically possible, with the steps outlined in process 700 shown in FIG. 7 and/or process 900 shown in FIG. 9 and/or process 1000 shown in FIG. 10.

At step 1110, information may be received from two or more platforms on which a user 110 consumed media. The platforms on which the user 110 may have consumed media may be an over-the-top streaming service, a broadcast media service, or the like.

At step 1120, a determination may be made as to which of the two platforms is of the most relevance. Such a determination may be made using the data processing techniques described herein, with particular reference to FIGS. 6A and 6B and the accompanying description.

At step 1130, media consumption information may be received from the platform deemed to be of most relevance. This media consumption information may include information about the media consumed, including metadata about the media, the user's progress through the media, along with other media information described herein.

At step 1140, similar to step 750 described above, further parameters for modifying the media guidance are generated in response to the behavior information. These parameters may be generated using the data processing techniques described herein, with particular reference to FIGS. 6A and 6B and the accompanying description. The parameters, in the current example, describe trends, recommendations, or trends regarding the media consumption habits of the user 110.

At step 1150, similar to step 760 described above, the media guidance application is modified based upon the further parameters. The media guidance application may be modified in a like fashion to that described in connection with FIG. 1. The media guidance application may be modified such that at least one program listing appears differently in the media guidance application.

The actions or descriptions of FIG. 11 may be used with any other example of this disclosure. In addition, the actions and descriptions described in relation to FIG. 11 may be done in any suitable alternative orders or in parallel to further the purposes of this disclosure.

FIG. 12 is a flowchart representing a process 1200 for modifying a media guidance application in determination upon the expiry date of a media item in accordance with some examples of the disclosure. Process 1200 starts at step 'B' which may correspond to that shown in FIG. 10. Whilst the example shown in FIG. 12 refers to the use of system 100, as shown in FIG. 1, it will be appreciated that the illustrative process shown in FIG. 12 and any of the other illustrative processes, may be implemented on system 100, system 200, system 300, either alone or in any combination, and/or on any other appropriately configured system architecture. Further, is it to be understood that the steps outlined in FIG. 12 may be incorporated, where technically possible, with the steps outlined in process 700 shown in FIG. 7 and/or process 900 shown in FIG. 9 and/or process 1000 shown in FIG. 10 and/or process 1100 shown in FIG. 11.

At step 1210, information about at least one item of media content which is available on a platform, which includes at least metadata which describes the media content and information about the date until which the at least one item of media content will be available on the platform is received.

At step 1220, information about the current date and time is received.

At step 1230, a pre-expiry time threshold is determined. This may be determined based upon the data analysis techniques described herein, may be pre-set by a user, or may be determined in any suitable way.

At step 1240, a determination is made as to whether the at least one item of media content is to be considered, based upon the pre-expiry time threshold. If it is, the process advances to step 1250. If not, the process may revert back to step 1210 and receive further information about further media content items available on a platform.

At step 1250, a determination is made by comparing the information about the date until which the item of media content will be available on the platform and the current date and time, and an availability period.

At step 1260, a determination is made as to whether the availability period is less than or equal to the pre-expiry time threshold. If it is, the process may advance to step 1270. If not, the process may revert back to step 1210 and receive further information about further media content items available.

At step 1270, at least one program listing in the media guidance application is modified such that the at least one modified program listing appears differently in the media guidance application.

The actions or descriptions of FIG. 12 may be used with any other example of this disclosure. In addition, the actions and descriptions described in relation to FIG. 12 may be done in any suitable alternative orders or in parallel to further the purposes of this disclosure.

Figure 13:
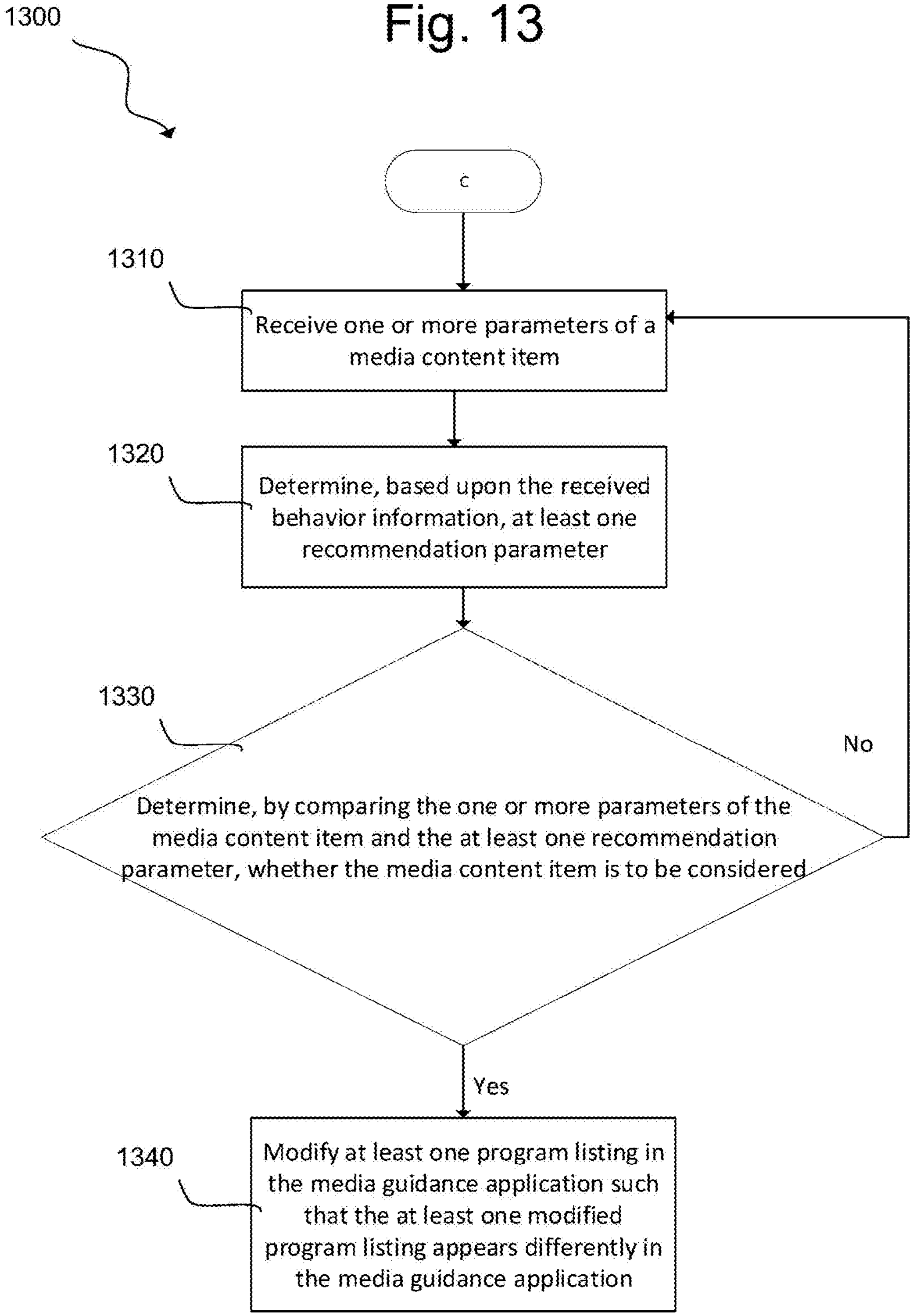
FIG. 13 is a flowchart representing a process for modifying a media guidance application in dependence upon a content recommendation in accordance with some example of the disclosure.

FIG. 13 is a flowchart representing a process 1300 for modifying a media guidance application in dependence upon a content recommendation in accordance with some examples of the disclosure. Process 1300 starts at step 'C' which may correspond to that shown in FIG. 10. Whilst the example shown in FIG. 13 refers to the use of system 100, as shown in FIG. 1, it will be appreciated that the illustrative process shown in FIG. 13 and any of the other illustrative processes, may be implemented on system 100, system 200, system 300, either alone or in any combination, and/or on any other appropriately configured system architecture. Further, is it to be understood that the steps outlined in FIG. 13 may be incorporated, where technically possible, with the steps outlined in process 700 shown in FIG. 7 and/or process 900 shown in FIG. 9 and/or process 1000 shown in FIG. 10 and/or process 1100 shown in FIG. 11 and/or progress 1200 shown in FIG. 12.

At step 1310, one or more parameters of a media content item are received, in line with the techniques described herein.

At step 1320, at least one recommendation parameter is determined is made, based upon the received behavior information, in line with the techniques described herein.

At step 1330, by comparing the one or more parameters of the media content item and the at least one recommendation parameter, a determination is made whether the media content item is to be considered. If the media content item is to be considered, the process advances to step 1340. If the media content item is not to be considered, the process may return to step 1310.

At step 1340, at least one program listing in the media guidance application is modified such that the at least one modified program listing appears differently in the media guidance application.

The actions or descriptions of FIG. 13 may be used with any other example of this disclosure. In addition, the actions and descriptions described in relation to FIG. 13 may be done in any suitable alternative orders or in parallel to further the purposes of this disclosure.

Figure 14:
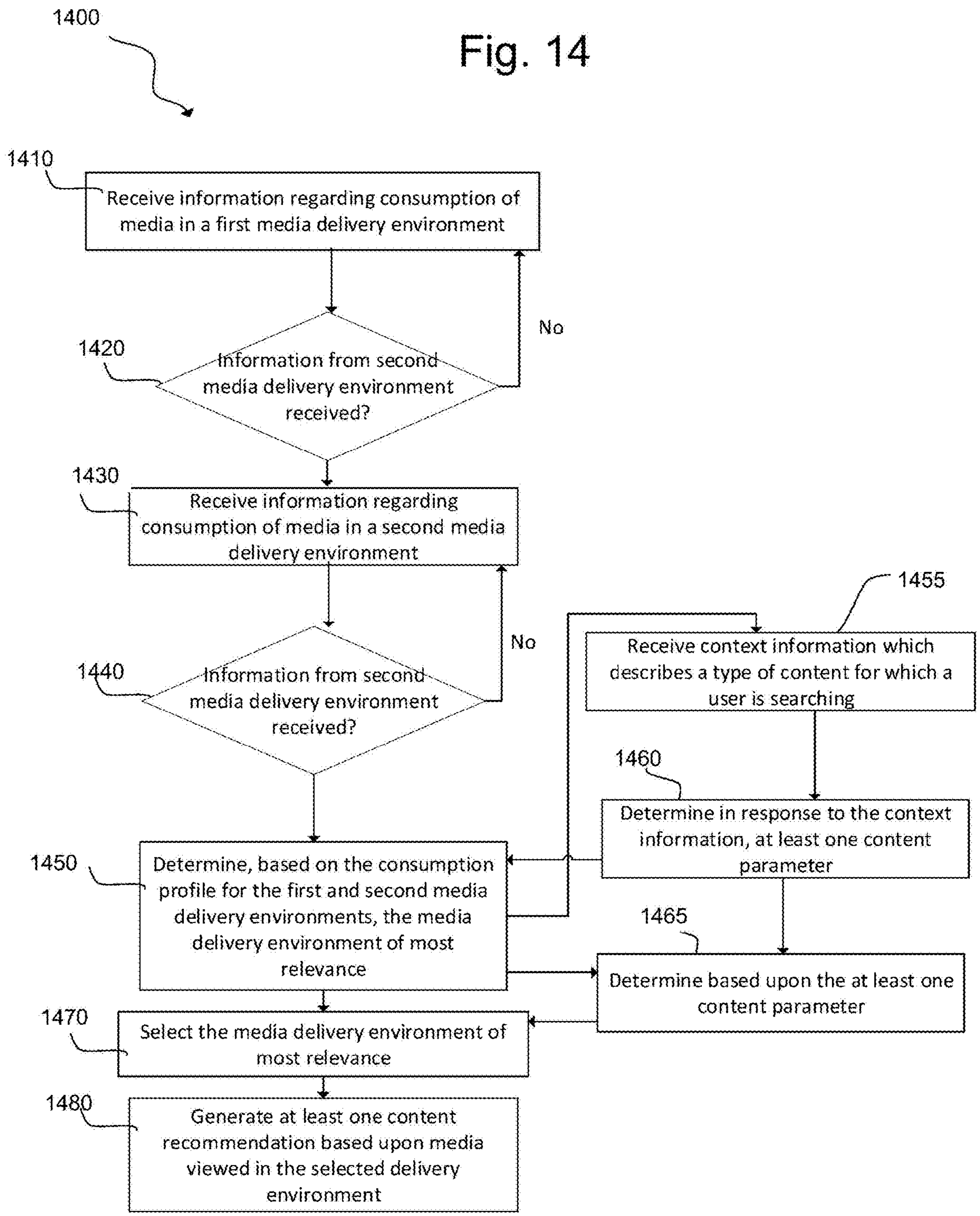
FIG. 14 is a flowchart representing a further process for providing a media recommendation in accordance with some examples of the disclosure.

FIG. 14 is a flowchart representing a process 1400 for process for providing a media recommendation in accordance with some examples of the disclosure. Whilst the example shown in FIG. 14 refers to the use of system 100, as shown in FIG. 1, it will be appreciated that the illustrative process shown in FIG. 14 and any of the other illustrative processes, may be implemented on system 100, system 200, system 300, either alone or in any combination, and/or on any other appropriately configured system architecture. Further, is it to be understood that the steps outlined in FIG. 14 may be incorporated, where technically possible, with the steps outlined in process 700 shown in FIG. 7 and/or process 900 shown in FIG. 9 and/or process 1000 shown in FIG. 10 and/or process 1100 shown in FIG. 11 and/or progress 1200 shown in FIG. 12 and/or process 1300 shown in FIG. 13.

At step 1410, in a similar way to step 910, information is received regarding consumption of media by a user 110 in a first media delivery environment. This media delivery environment may be an over-the-top streaming service, online video sharing platform, audio delivery platform, or similar.

At step 1420, in a similar way to step 920, a determination may be made as to whether the information regarding consumption of media by a user 110 in a first media delivery environment has been received. If this information has not been received, the process may return to the previous step, step 1410. If the information has been received, the process may advance. A check to establish whether the information is valid may also be carried out.

At step 1430, in a similar way to step 930, information is received regarding consumption of media by a user 110 in a second media delivery environment. This media delivery environment is a different media delivery environment, and may be a different over-the-top streaming service, online video sharing platform, audio delivery platform, or similar.

At step 1440, in a similar way to step 940, a determination may be made as to whether the information regarding consumption of media by a user 110 in a second media delivery environment has been received. If this information has not been received, the process may return to the previous step, step 910. If the information has been received, the process may advance. A check to establish whether the information is valid may also be carried out.

At step 1450, in a similar way to step 950, in response to the information received regarding media consumption in the first and second media delivery environments, a media consumption profile is determined for each of the first and second media delivery environments.

At step 1455, context information is received which describes a type of content for which a user 110 is searching. The type of content may include video content, audio content, streaming content, broadcast content.

At step 1460, at least one content parameter is determined in response to the context parameter determined at step 1455.

At step 1465, a determination is made based upon the context parameter determined at step 1460.

At step 1470, in a similar way to step 970, based upon the consumption profiles determined, the media delivery environment of most relevance is selected.

At step 1480, in a similar way to step 980, at least one content recommendation is generated based upon the viewing history of the user 110 in the selected media delivery environment.

The actions or descriptions of FIG. 14 may be used with any other example of this disclosure. In addition, the actions and descriptions described in relation to FIG. 14 may be done in any suitable alternative orders or in parallel to further the purposes of this disclosure.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods. In this specification, the following terms may be understood given the below explanations:

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words “comprise” and “contain” and variations of them mean “including but not limited to”, and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed.

The reader’s attention is directed to all papers and documents which are filed concurrently with or previous to this specification in connection with this application and which are open to public inspection with this specification, and the contents of all such papers and documents are incorporated herein by reference.

What is claimed is:

1. A method comprising:
- receiving a first user input from a device associated with a user profile of a content application;
- based at least in part on receiving the first user input, initiating a browsing session for the user profile;
- receiving user interaction data corresponding to the browsing session;
- determining a graph representation of the user interaction data corresponding to the browsing session, wherein the graph representation is suitable for use by a machine learning model;
- based on the graph representation of the user interaction data, determining one or more context parameters for the browsing session, wherein the one or more context parameters relate to one or more trends identified from the user interaction data; and
- modifying the content application based at least in part on the one or more context parameters.

2. The method of claim 1, wherein the content application is a first content application, and wherein the method further comprises:
- receiving content availability data from a second content application, wherein the second content application is different from the first content application; and
- based on the content availability data and the graph representation of the user interaction data corresponding to the browsing session, determining, using control circuitry, at least one content item available on the second content application that is not available from the first content application.

3. The method of claim 2, wherein the determining the one or more context parameters for the browsing session is based at least in-part on determining the at least one content item available on the second content application that is not available from the first content application.

4. The method of claim 3, further comprising:
- generating, for display, the modified first content application, wherein a listing for the at least one content item available on the second content application but not available from the first content application is visually distinguishable from other content items available on the first content application.

5. The method of claim 1, wherein the determining one or more context parameters for the browsing session further comprises:
- analyzing the user interaction data based on a recommendation model.

6. The method of claim 5, wherein the recommendation model comprises weightings assigned to the user interaction data, and wherein the weightings are determined based on one or more predetermined factors.

7. The method of claim 1, further comprising:
- receiving parameters related to one or more content items available from the content application;
- determining, based on the user interaction data and the parameters related to the one or more content items available from the content application, at least one recommendation parameter;
- determining, based on comparing metadata of a first content item to the at least one recommendation parameter, whether to recommend the first content item during the browsing session; and
- based on determining that the first content item is to be recommended during the browsing session, modifying the content application such that a listing for the first content item is visually distinguishable from other content items available on the content application.

8. The method of claim 1, wherein the user interaction data comprises information about content items that a user of the user profile has interacted with during the browsing session.

9. The method of claim 1, wherein the modifying the content application comprises generating for display at least one advertisement in the content application.

10. The method of claim 1, wherein the context parameters comprise key value pairs used to identify content items in the content application to recommend.

11. A system comprising:
- a memory;
- an input/output (I/O) circuitry configured to:

receive a first user input from a device associated with a user profile of a content application;

a control circuitry configured to:

based at least in part on receiving the first user input, initiate a browsing session for the user profile;

wherein the I/O circuitry is further configured to:

receive user interaction data corresponding to the browsing session;

and wherein the control circuitry is further configured to:

determine a graph representation of the user interaction data corresponding to the browsing session, wherein the graph representation is suitable for use by a machine learning model;

based on the graph representation of the user interaction data, determine one or more context parameters for the browsing session, wherein the one or more context parameters relate to one or more trends identified from the user interaction data; and modify the content application based at least in part on the one or more context parameters.

12. The system of claim 11, wherein the content application is a first content application, and wherein the control circuitry is further configured to:

receive content availability data from a second content application, wherein the second content application is different from the first content application; and based on the content availability data and the graph representation of the user interaction data corresponding to the browsing session, determine, using control circuitry, at least one content item available on the second content application that is not available from the first content application.

13. The system of claim 12, wherein the control circuitry is configured to determine the one or more context parameters for the browsing session based at least in-part on determining the at least one content item available on the second content application that is not available from the first content application.

14. The system of claim 13, wherein the input/output circuitry is further configured to:

generate, for display, the modified first content application, wherein a listing for the at least one content item available on the second content application but not available from the first content application is visually distinguishable from other content items available on the first content application.

15. The system of claim 11, wherein the control circuitry is configured to determine one or more context parameters for the browsing session by:

analyzing the user interaction data based on a recommendation model.

16. The system of claim 15, wherein the recommendation model comprises weightings assigned to the user interaction data, and wherein the control circuitry is further configured to determine the weightings based on one or more predetermined factors.

17. The system of claim 11, wherein the control circuitry is further configured to:

receive parameters related to one or more content items available from the content application;

determine, based on the user interaction data and the parameters related to the one or more content items available from the content application, at least one recommendation parameter;

determine, based on comparing metadata of a first content item to the at least one recommendation parameter, whether to recommend the first content item during the browsing session; and based on determining that the first content item is to be recommended during the browsing session, modify the content application such that a listing for the first content item is visually distinguishable from other content items available on the content application.

18. The system of claim 11, wherein the user interaction data comprises information about content items that a user of the user profile has interacted with during the browsing session.

19. The system of claim 11, wherein the control circuitry is configured to modify the content application by generating for display at least one advertisement in the content application.

20. The system of claim 11, wherein the context parameters comprise key value pairs used to identify content items in the content application to recommend.

* * * * *